(12) United States Patent
Zhou et al.

(10) Patent No.: US 10,348,567 B2
(45) Date of Patent: Jul. 9, 2019

(54) MAPPING USER IDENTIFIERS BETWEEN DIFFERENT DEVICE ECOSYSTEMS

(71) Applicant: Microsoft Technology Licensing, LLC, Redmond, WA (US)

(72) Inventors: Shaoyu Zhou, Issaquah, WA (US); Tao Di, Newcastle, WA (US); Shaojian He, Issaquah, WA (US); Jason Zhu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 14/884,464

(22) Filed: Oct. 15, 2015

(65) Prior Publication Data

US 2017/0111226 A1 Apr. 20, 2017

(51) Int. Cl.
| | |
|---|---|
| *H04L 12/24* | (2006.01) |
| *H04L 29/08* | (2006.01) |
| *H04L 29/06* | (2006.01) |
| *H04W 12/08* | (2009.01) |

(52) U.S. Cl.
CPC ........ *H04L 41/0893* (2013.01); *H04L 63/104* (2013.01); *H04L 67/18* (2013.01); *H04L 67/22* (2013.01); *H04L 67/306* (2013.01); *H04L 67/327* (2013.01); *H04W 12/08* (2013.01)

(58) Field of Classification Search
CPC .................................................. H04L 41/0893
See application file for complete search history.

(56) References Cited

U.S. PATENT DOCUMENTS

| | | | |
|---|---|---|---|
| 8,326,834 | B2 | 12/2012 | Xiao et al. |
| 8,606,293 | B2 | 12/2013 | Kim et al. |
| 8,843,394 | B2 | 9/2014 | Cao et al. |
| 9,514,248 | B1 * | 12/2016 | Guan ................. H04L 29/06 |
| 2013/0036434 | A1 | 2/2013 | Shkedi et al. |
| 2013/0124309 | A1 | 5/2013 | Traasdahl et al. |
| 2013/0124315 | A1 | 5/2013 | Doughty et al. |

(Continued)

OTHER PUBLICATIONS

Olteanu, et al., "Quantifying the Effect of Co-Location Information on Location Privacy", in Proceedings of 14th Privacy Enhancing Technologies Symposium, Jul. 2014, 21 pages.

(Continued)

*Primary Examiner* — Andrew C Georgandellis
(74) *Attorney, Agent, or Firm* — Jeffrey L. Ranck; Ranck IP Law

(57) ABSTRACT

Techniques and technologies for mapping user identifiers between different device ecosystems are described. In at least some embodiments, a system includes a processing component, a memory, and a mapping engine configured to map a first identifier associated with a user with a second identifier, at least one of the first or second identifiers being associated with a first device ecosystem; and map a third identifier associated with a second device ecosystem with at least one of the first identifier or the second identifier, the second device ecosystem different from the first device ecosystem, based at least partially on (i) a plurality of first co-location occurrences of the third identifier with the first identifier, and (ii) a plurality of second co-location occurrences of the third identifier with the second identifier. The mapping engine may provide an indication of an association of the third identifier with the user.

20 Claims, 7 Drawing Sheets

(56) References Cited

U.S. PATENT DOCUMENTS

| | | | |
|---|---|---|---|
| 2014/0095320 A1* | 4/2014 | Sivaramakrishnan | H04W 4/21 705/14.66 |
| 2014/0337867 A1 | 11/2014 | Wilson | |
| 2014/0378066 A1* | 12/2014 | Liu | H04W 24/08 455/67.11 |
| 2015/0248706 A1* | 9/2015 | Mi | G06Q 30/0269 705/14.53 |
| 2016/0224901 A1* | 8/2016 | Scarr | H04L 67/22 |

OTHER PUBLICATIONS

Yoo, et al., "A Join-less Approach for Co-location Pattern Mining: A Summary of Results", in Technical Report, Dec. 29, 2005, 10 pages.

Zala, et al., "A Survey on Spatial Co-location Patterns Discovery from Spatial Datasets", in International Journal of Computer Trends and Technology, vol. 7 Issue 3, Jan. 2014, pp. 137-142.

Huang, et al., "On the Relationships between Clustering and Spatial Co-location Pattern", in Proceedings of the 18th IEEE International Conference on Tools with Artificial Intelligence, Nov. 13, 2006, 8 pages.

Hazas, et al., "A Relative Positioning System for Co-located Mobile Devices", in Proceedings of 3rd International Conference on Mobile System Application and Services, Jun. 6, 2005, 14pages.

Manweiler, et al., "SMILE: Encounter-Based Trust for Mobile Social Services", in Proceedings of 16th ACM Conference on Computer and Communications Security, Nov. 9, 2009, 10 pages.

Krishna Mohana Gorijala, "Approaches towards Co-location Rule Mining", in Thesis of Master of Technology, Aug. 7, 2015, 55 pages.

Sengstock, et al., "Spatial Interestingness Measures for Co-location Pattern Mining", in 12th IEEE International Conference on Data Mining Workshops, ICDM Workshops, Dec. 10, 2012, 6 pages.

Huang, et al., "Mining Co-Location Patterns with Rare Events from Spatial Data Sets", in Journal of Geoinformatica, vol. 10 Issue 3, Sep. 2006, pp. 239-260.

Bilogrevic, et al., "Adaptive Information-Sharing for Privacy-Aware Mobile Social Networks", in proceedings of the 2013 ACM International Joint Conference on Pervasive and Ubiquitous Computing, Sep. 8, 2013, 10 pages.

Huang, et al., "Mining Confident Colocation Rules without a Support Threshold", in the Eighteenth Annual ACM Symposium on Applied Computing, Mar. 9, 2003, 5 pages.

"International Search Report and Written Opinion Issued in PCT Application No. PCT/US2016/055095", dated Dec. 16, 2016, 12 Pages.

"Second Written Opinion Issued in PCT Application No. PCT/US2016/055095", dated Sep. 22, 2017, 5 Pages.

"International Preliminary Report on Patentability Issued in PCT Application No. PCT/US2016/055095", dated Jan. 2, 2018, 7 Pages.

* cited by examiner

MAPPING USER IDENTIFIERS BETWEEN DIFFERENT DEVICE ECOSYSTEMS

BACKGROUND

Many people interact with several different electronic devices during their daily lives. At their homes, people may operate a wide variety of personal computing devices (e.g. desktops, laptops, set-top devices, gaming devices, etc.) to perform a variety of daily activities (e.g. shopping, communications, social media, research, gaming, etc.). Similarly, people may operate additional computing devices at their place of employment to perform their work-related activities (e.g. desktops, servers, laptops, notebook computers, etc.). And while commuting between home and work, they may operate still other electronic devices, including a variety of mobile devices (e.g. cellular phones, personal data assistants, vehicle-based devices, etc.).

It may be desirable to identify a person using a device (or associate a profile with the person) for various reasons. For example, providers of personalized services or products may desire to know the identity (or profile) of a potential consumer that is using an electronic device in order to provide appropriately personalized services or products. More specifically, in recent years, mobile devices have become increasingly popular for targeted content delivery, such as advertising. To get a comprehensive behavioral picture of a potential customer across multiple devices for targeting, it is necessary to link the user identifiers on these devices together. However, linking user identifiers on mobile devices to the identifiers on other devices (e.g. personal computers (PCs), laptops, etc.) is a challenge, especially in the context of different device ecosystems.

Devices within a particular device ecosystem may be designed to work well with each other, and may provide improved commonality such as common applications, and employing similar user interfaces. Currently, however, there are no existing identifier sync services to map identifiers between different device ecosystems.

SUMMARY

In at least some embodiments, a system for mapping user identifiers between different device ecosystems may include a processing component operatively coupled to a memory, and a mapping engine at least partially disposed in the memory. In at least some embodiments, the mapping engine may be configured to map a first identifier associated with a user with a second identifier, at least one of the first or second identifiers being associated with a first device ecosystem; and map a third identifier associated with a second device ecosystem with at least one of the first identifier or the second identifier, the second device ecosystem being different from the first device ecosystem, the mapping being based at least partially on (i) a plurality of first co-location occurrences of the third identifier with the first identifier, and (ii) a plurality of second co-location occurrences of the third identifier with the second identifier. In at least some embodiments, the mapping engine may be further configured to provide an indication of an association of the third identifier with the user.

In still other implementations, a method at least partially implemented using one or more processing components may include mapping a first identifier associated with a user with a second identifier, at least one of the first or second identifiers being associated with a first device ecosystem; mapping a third identifier associated with a second device ecosystem with at least one of the first identifier or the second identifier, the second device ecosystem being different from the first device ecosystem, and providing an indication of an association of the third identifier with the user. In at least some implementations, the mapping includes determining a plurality of first co-location occurrences scores indicative of the third identifier and one or more other identifiers accessing a first network access, determining a plurality of second co-location occurrence scores indicative of the third identifier and one or more other identifiers accessing a second network access, processing the plurality of first co-location occurrence scores and the plurality of second co-location occurrence scores to determine a highest first co-location occurrence score and a highest second co-location occurrence score; and if either the highest first co-location occurrence score corresponds to at least one of the first or second identifier, or the highest second co-location occurrence score corresponds to at least one of the first or second identifier, then map the third identifier to the corresponding at least one of the first identifier or the second identifier.

Similarly, in at least some implementations, one or more computer-readable media bearing one or more instructions that, when executed by one or more processing components, perform operations comprising: mapping a first identifier associated with a user with a second identifier, at least one of the first or second identifiers being associated with a first device ecosystem; mapping a third identifier associated with a second device ecosystem with at least one of the first identifier or the second identifier, the second device ecosystem being different from the first device ecosystem, and providing an indication of an association of the third identifier with the user. In at least some implementations, the mapping may include: determining a plurality of first co-location occurrences scores indicative of the third identifier and one or more other identifiers accessing a first network access, determining a plurality of second co-location occurrence scores indicative of the third identifier and one or more other identifiers accessing a second network access, processing the plurality of first co-location occurrence scores and the plurality of second co-location occurrence scores to determine a highest first co-location occurrence score and a highest second co-location occurrence score; and if either the highest first co-location occurrence score corresponds to at least one of the first or second identifier, or the highest second co-location occurrence score corresponds to at least one of the first or second identifier, then map the third identifier to the corresponding at least one of the first identifier or the second identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

DETAILED DESCRIPTION

The present disclosure describes techniques and technologies for mapping user identifiers between different device ecosystems. Such techniques and technologies may be implemented in a wide variety of computing devices (e.g. non-mobile computing devices and mobile computing devices). In addition, such devices may be operating a wide variety of device ecosystems. As described more fully below, techniques and technologies for mapping user identifiers in accordance with the present disclosure may advantageously determine an identity of a user of a device, even when the user changes between devices that are operating within different device ecosystems.

In general, the term "device ecosystem" (or simply "ecosystem") may refer to one or more aspects of a device's software characteristics, hardware characteristics, firmware characteristics, or other suitable characteristics (e.g. operating characteristics, etc.). A device ecosystem may, for example, depend upon a particular manufacturer or brand name (e.g. Microsoft, Google, Apple, etc.), or upon a particular software component or software suite (e.g. Windows, Android, iOS, etc.).

In at least some implementations, the present disclosure provides techniques and technologies for mapping user identifiers between different device ecosystems utilizing behavior patterns to link user identifiers on mobile devices (e.g. cell phones, tablets, etc.) with those on non-mobile devices (e.g. PCs). In at least some implementations, such techniques and technologies may use location behavior patterns, temporal behavior patterns, or both. For example, in at least some implementations, such techniques and technologies may record the IP addresses accessed by user identifiers on non-mobile devices (e.g. PCs) and mobile devices, as well as the times such devices are associated with (or accessing) a particular IP address. Thus, in at least some implementations, based on the time and location of a mobile device associated with a mapped cluster of non-mobile user identifiers, such techniques and technologies can link the user identifier of the mobile device to the mapped clusters of non-mobile device user identifiers. Such techniques and technologies may enable improved identification of mobile device users based on activities on both non-mobile devices and mobile devices, even across different device ecosystems.

Figure 1:
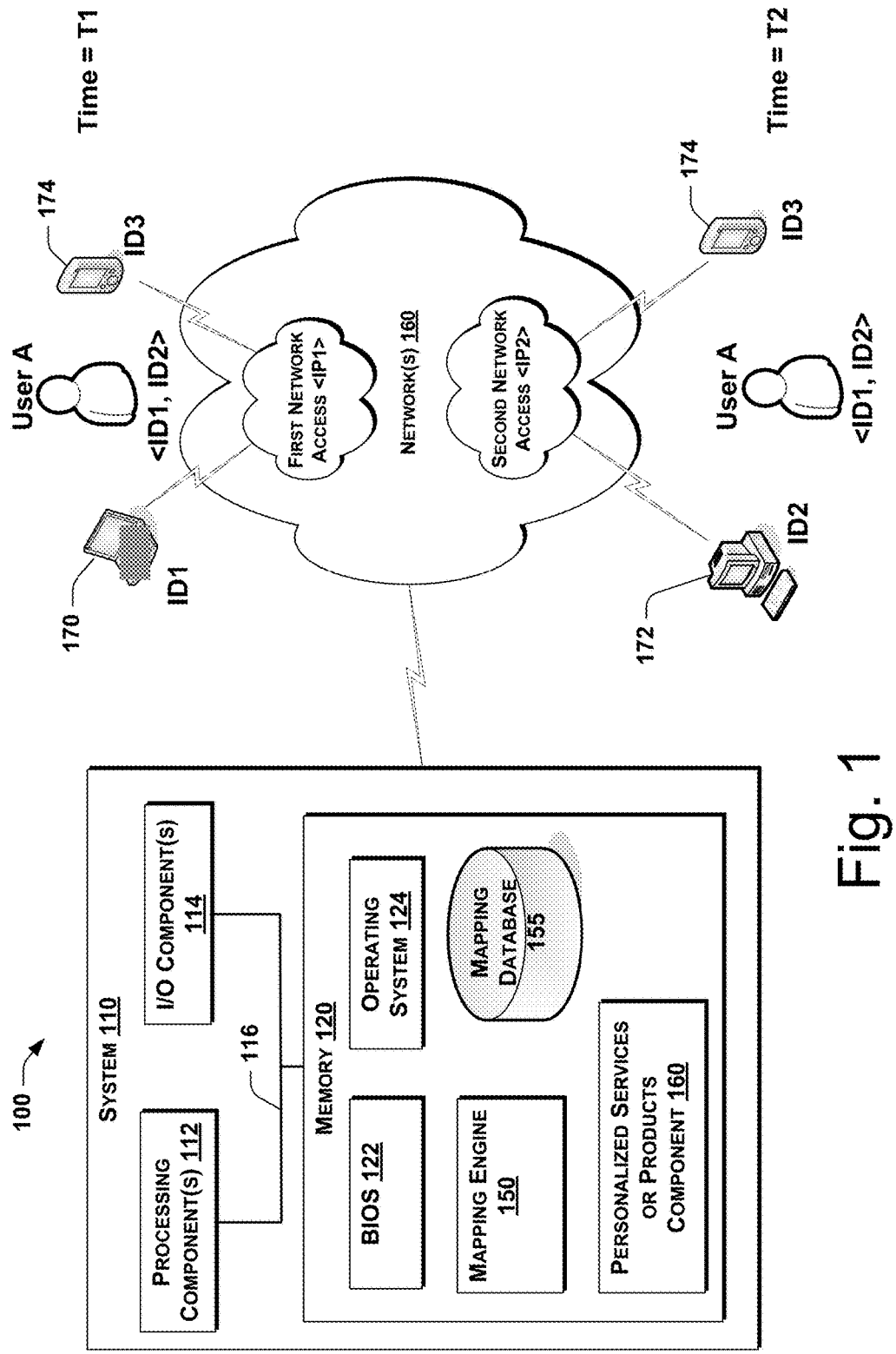
FIG. 1 shows an embodiment of an environment for mapping user identifiers between different device ecosystems.

FIG. 1 shows an embodiment of an environment 100 for mapping user identifiers between different device ecosystems. In this embodiment, the environment 100 includes a system 110 having one or more processing components 112 and one or more input/output (I/O) components 114 coupled to a memory 120 by a bus 116. The memory 120 of this embodiment includes a basic input/output system (BIOS) 122, which provides basic routines that help to transfer information between elements within the system 110, and an operating system 124 that manages and provides common services to the various elements of the system 110.

In the embodiment shown in FIG. 1, the memory 120 of the system 110 also includes a mapping engine 150 for mapping user identifiers, and a mapping database 155 that stores information that may be accessed by the mapping engine 150. More specifically, the mapping engine 150 may include instructions that, when executed by the one or more processing components 112, perform one or more operations for mapping user identifiers as described herein. The memory 120 may further include a personalized services or products component 160 that may receive mapping information from the mapping engine 150 and may provide one or more personalized services or products to the mobile device 174 of the User A based on the mapping information. For example, in at least some implementations, the personalized services or products component 160 may provide a customized (or targeted) advertisement to the User A.

It will be appreciated that the illustrative system 110 represents a variety of possible system types, including but not limited to a server, a mainframe, a workstation, a desktop computing device, a portable or hand-held computing device, a distributed computing system, a cloud-based computing system, or any other suitable type of system. As shown in FIG. 1, the system 110 may communicate with one or more other devices (e.g. via I/O components 114), either directly or indirectly via one or more networks 160 (e.g. cellular network, global communication network, Local Area Network (LAN), Wide Area Network (WAN), wired or wireless network, etc.), including, for example, a laptop computing device 170 (e.g. laptop, notebook, etc.), a desktop computing device 176, and a mobile device 174 (e.g. cellular telephone, tablet, notebook, Personal Data Assistant (PDA), etc.).

In at least some implementations, the system 110 and the devices 170, 172, 174 may be readily categorized as "mobile" or "non-mobile" devices, however, in at least some implementations, the system 110 and the devices 170, 172, 174 may not be so readily categorized. For example, in at least some implementations, one or more of the system 110 and the devices 170, 172, 174 may actually be considered both "mobile" and "non-mobile," or may share at least some characteristics or attributes of both "mobile" and "non-mobile" device categories. Therefore, it should be appreciated that the terms "mobile" and "non-mobile" may be used herein for reference or convenience, however, such terms are not intended to be mutually exclusive or limiting with respect to the various devices that may be involved in the techniques and technologies described herein.

As further shown in FIG. 1, the various devices 170, 172, 174 may access the one or more networks 160 via a first network access having a first Internet Protocol (IP) address IP1 and a second network access having a second IP address IP2. More specifically, at a first time (or first time period) T1, a User A may operate the laptop computing device 170 to access the one or more networks 160 via the first network access IP1. A first identifier ID1 is associated with the User A on the laptop computing device 170. Similarly, the mobile device 174 having a third identifier ID3 may also access the one or more networks 160 via the first network access IP1.

It should be appreciated that other devices (not shown) having other device identifiers may also connect to the first network access IP1 at (or during) the first time T1, which other devices (and device identifiers) are not depicted in FIG. 1 for the sake of clarity. As used herein, the term "user identifier" may be understood to refer to a device identifier that has been associated with a particular user. Thus, a user that uses multiple devices may have multiple "user identifiers" that are associated with the user.

With continued reference to FIG. 1, the User A may move from one location to another along with the mobile device 174. At a second time T2, the User A may operate the desktop computing device 172 to access the one or more networks 160 via the second network access IP2. A second identifier ID2 is associated with the User A on the desktop computing device 172. Also, at the second time T2, the mobile device 174 having the third identifier ID3 may access the one or more networks 160 via the second network access IP2. Again, it may be noted that other devices (not shown) having other device identifiers may also connect to the second network access IP2 at (or during) the second time T2, which other devices (and device identifiers) are not depicted in FIG. 1 for the sake of clarity.

As time passes, the User A may move back and forth between different locations such that the first identifier ID1 may access the first network access IP1 at a plurality of times T1, the third identifier ID3 may access the first network access IP1 at another plurality of times T1, the second identifier ID2 may access the second network access IP2 at another plurality of times T2, and the third identifier ID3 may access the second network access IP2 at another plurality of times T2.

In at least some implementations, the laptop computing device 170 and the desktop computing device 172 may operate with the same (or substantially similar) device ecosystems. Additionally, in at least some implementations, the mobile device 174 may operate with a different (or substantially different) device ecosystem than the device ecosystems of the devices 170, 172. As described more fully below, the system 110 having the mapping engine 150 may implement techniques and technologies that may advantageously enable improved identification of User A on the mobile device 174 based on activities of the devices 170, 172, 174, even when the mobile device 174 is operating based on a different (or substantially different) device ecosystem from that of the devices 170, 172.

Figure 2:
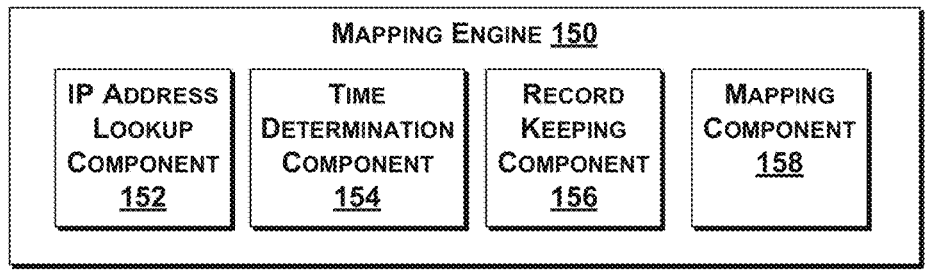
FIG. 2 shows an embodiment of a mapping engine for mapping user identifiers between different device ecosystems.

FIG. 2 shows an embodiment of a mapping engine 150 for mapping user identifiers between different device ecosystems. In this implementation, the mapping engine 150 includes an IP address lookup component 152. The IP address lookup component 152 is configured to determine a location of an IP address (e.g. a personal residence, a private business address, a public address, etc.). In addition, in this implementation, the mapping engine 150 includes a time determination component 154. The time determination component 154 is configured to identify the time of day that a device connects to an IP address, which may be used, for example, to determine whether a connection occurred during normal working hours, off-work hours, or other established periods of time. The time determination component 154 may, for example, take into consideration different countries, regions, time zones, holidays, and other various factors.

As further shown in FIG. 2, in this implementation, the mapping engine 150 includes a record keeping component 156. The record keeping component 156 is configured to communicate with other components of the system 110 and the mapping engine 150, including the IP address lookup component 152 and the time determination component 154, and to record user identifiers (e.g. ID1, ID2, ID3) that occur on an IP address (e.g. IP1, IP2) at a particular time (e.g. T1, T2). More specifically, in at least some implementations, the record keeping component 156 includes or generates a map keyed by <IP address, hour> which records all user identifiers that are occurring on an IP address (or network access) at a particular time (or time period). The mapping component 158 is configured to analyze the records generated by the record keeping component 156 and to score the co-locations of identifier pairs (e.g. <ID1, ID2>, <ID1, ID3>, <ID2, ID3>, etc.), as described more fully below. In at least some implementations, the record keeping component 156 may receive in-coming entries of <IP Address, Hour> when event logs are processed (e.g. hourly event log), and the mapping component 158 may continuously (or non-continuously) process the new entries added by the record keeping component to perform one or more mapping operations described herein. It will be appreciated, of course, that the mapping engine 150 may be implemented in a wide variety of embodiments, and that the mapping engine 150 is not limited to the particular illustrative embodiment shown in FIG. 2.

Figure 3:
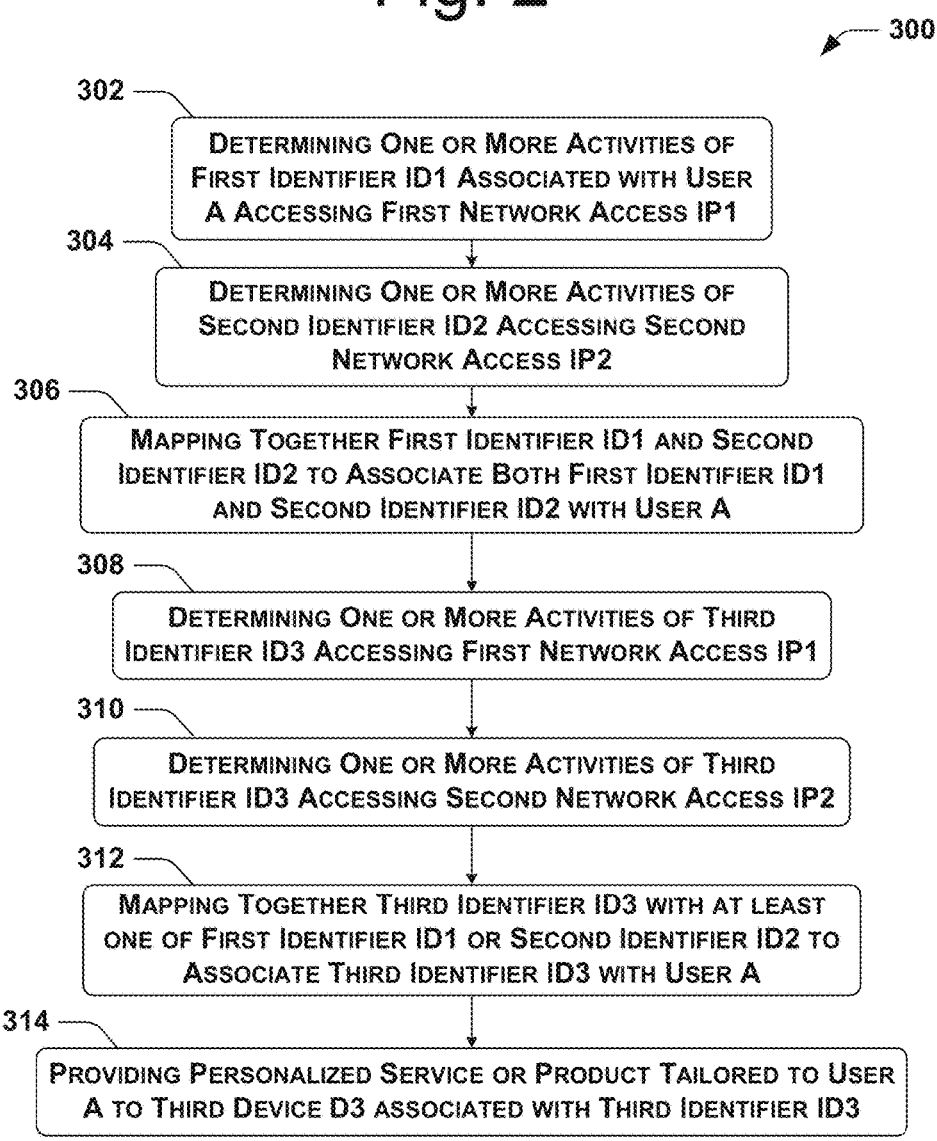
FIG. 3 shows an embodiment of a process for mapping user identifiers between different device ecosystems to provide personalization services or products.

FIG. 3 shows an embodiment of a process 300 for mapping user identifiers between different device ecosystems to provide personalization services or products. In this implementation, the process 300 includes determining one or more activities of a first identifier ID1 associated with a User A accessing a first network access IP1 at 302. Such determining one or more activities (at 302) may include, for example, receiving one or more indications that a first device D1 (e.g. laptop computing device 170) having the first identifier ID1 associated with the User A has accessed one or more networks via the first network access IP1 at one or more first times T1.

In the implementation shown in FIG. 3, the process 300 also includes determining one or more activities of a second identifier ID2 accessing a second network access IP2 at 304. In at least some implementations, the determining one or more activities (at 304) may include, for example, receiving one or more indications that a second device D2 (e.g. desktop computing device 172) having the second identifier ID2 has accessed one or more networks via the second network access IP2 at one or more second times T2.

The process 300 also includes mapping together the first identifier ID1 and the second identifier ID2 to associate both the first identifier ID1 and the second identifier ID2 with the User A at 306. For example, in at least some implementations, the mapping of the first and second identifiers ID1, ID2 (at 306) uses a known mapping algorithm to associate both the first identifier ID1 and the second identifier ID2 with the User A (i.e. A={ID1, ID2}) as disclosed in U.S. Pat. No. 8,843,394 issued to Cao et al., which patent is incorporated herein by reference. In at least some implementations, the mapping of the first and second identifiers ID1, ID2 (at 306) may employ a known algorithm as described more fully below with reference to FIG. 6.

As further shown in FIG. 3, the process 300 may also include determining one or more activities of a third identifier ID3 accessing the first network access IP1 at 308. For example, in at least some implementations, the determining one or more activities (at 308) may include receiving one or more indications that a third device D3 (e.g. mobile device 174) having the third identifier ID3 has accessed one or more networks via the first network access IP1 at one or more first times T1.

Similarly, the process 300 may also include determining one or more activities of a third identifier ID3 accessing the second network access IP2 at 310. In at least some implementations, the determining one or more activities (at 310) may include, for example, receiving one or more indications that the third device D3 (e.g. mobile device 174) having the third identifier ID3 has accessed one or more networks via the second network access IP2 at one or more second times T2.

The process 300 may further include mapping together the third identifier ID3 with at least one of the first identifier ID1 or the second identifier ID2 to associate the third identifier ID3 with the User A at 312. More specifically, in at least some implementations, the mapping component 158 of the mapping engine 150 may analyze information regarding the one or more activities of the first, second, and third identifiers ID1, ID2, ID3 accessing the first and second network accesses IP1, IP2 determined in the previous operations 302, 304, 308, and 310, and may score the co-occurrences of identifier pairs (e.g. <ID1, ID2>, <ID1, ID3>, <ID2, ID3>). In this way, using co-occurrences (or co-locations) of a pair of identifiers at the same location (e.g. same IP address) at the same time, techniques and technologies in accordance with the present disclosure may advantageously map user identifiers across multiple devices, even when the devices may be operating in different (or substantially different) ecosystems.

As used herein, the term "co-occurrence" (or "identifier co-occurrence" or "co-location occurrence") may be used to refer to the logging of identifier pairs in one or more places (e.g. network accesses or other suitable data sources) when the identifiers are seen together. Within the same (or substantially similar) ecosystems, identifier co-occurrence is usually supported. For example, on most personal computers (PCs) that operate Windows® operating systems, Microsoft identifiers are typically present and can serve as a linkage to map other identifiers. However, in different ecosystems, such as devices that operate different operating systems (e.g. iOS, Android, etc.), it may be difficult to map identifiers across these ecosystems as there are typically no common linkages.

The scoring of identifier co-occurrences (at 312) may be accomplished in a variety of suitable ways. For example, in at least some implementations, the scoring of the identifier pairs may include counting a number of occurrences of the two identifiers of an identifier pair having accessed a particular network access (e.g. IP1, IP2) at the same time or within a given period of time (e.g. within 1 min of each other, etc.). In at least some implementations, based on the scoring of the co-occurrences (or co-locations) of the first identifier with the third identifier (e.g. <ID1, ID3>), the mapping component 158 of the mapping engine 150 may map (or associate) the third identifier ID3 with the first identifier ID1, thereby associating the third identifier ID3 (of the mobile device D3) with the User A (at 312). Similarly, in at least some implementations, based on the scoring of the co-occurrences of the second identifier with the third identifier (e.g. <ID2, ID3>), the mapping component 158 of the mapping engine 150 may map (or associate) the third identifier ID3 with the second identifier ID2, thereby associating the third identifier ID3 (of the mobile device D3) with the User A (at 312).

Referring again to FIG. 3, the process 300 may further include providing a personalized service or product tailored to User A (e.g. personalized services or products component 160 may provide targeted advertisement or other personalized service, product, or aspect) to the third device D3 associated with the third identifier ID3 at 314. For example, in at least some implementations, the providing a personalized service or product tailored to User A (at 314) may include determining a profile associated with the User A (e.g. gender, age group, prior demonstrated affinity, etc.), selecting an advertisement from a plurality of advertisements based at least partially on the profile, and providing the selected advertisement to the third device D3.

It will be appreciated that techniques and technologies for mapping user identifiers between different device ecosystems may provide substantial operational improvements in comparison with conventional operations. For example, such techniques and technologies enable appropriately tailored personalization services or products to be provided to a user of a device, thereby reducing or eliminating unnecessary processing requirements or energy consumption associated with repeated delivery of inappropriate personalization services or products, or repeated attempts to determine (or re-determine) an identity of a user. Because the techniques and technologies for mapping user identifiers as disclosed herein may even be employed between different device ecosystems, such techniques and technologies may operate more efficiently with fewer computational operations required to achieve the desired result, with reduced resource usage (e.g., less memory usage, less power consumption, etc.), and with less strain on infrastructure (e.g. reduced bandwidth usage associated with incorrect or inappropriate operations, etc.) in comparison with conventional techniques and technologies.

Techniques and technologies for mapping user identifiers between different device ecosystems in accordance with the present disclosure are not necessarily limited to the particular embodiments described above with reference to FIGS. 1-3. In the following description, additional embodiments of techniques and technologies for mapping user identifiers between different device ecosystems will be described. It should be appreciated that the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional, or may be variously combined to create still further embodiments. In the following discussion of additional embodiments, common reference numerals may be used to refer to elements introduced above, and for the sake of brevity, descriptions of previously-introduced elements may be omitted so that emphasis can be properly placed on new or varying aspects of such additional embodiments.

Figure 4:
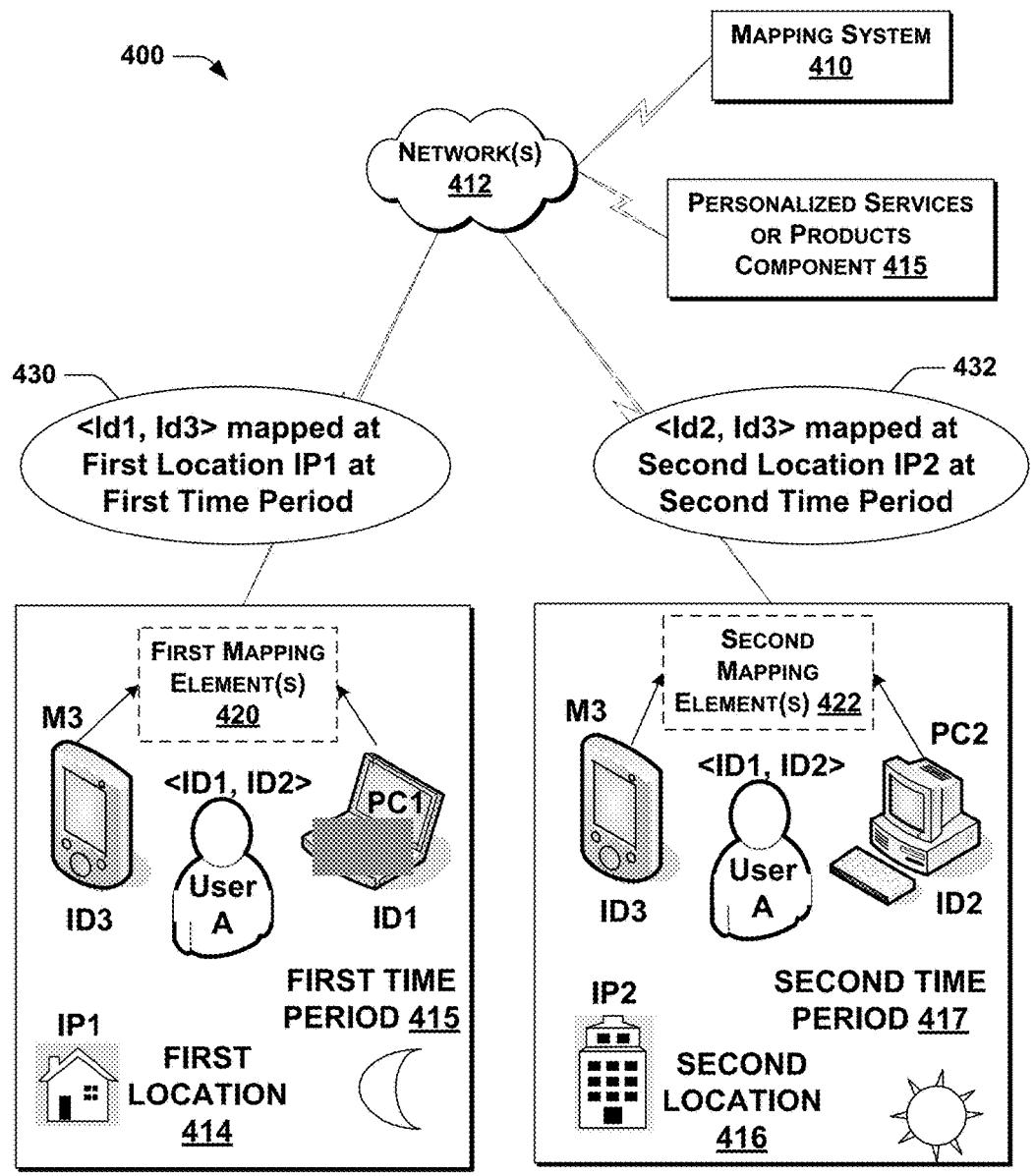
FIG. 4 shows another embodiment of an environment for mapping user identifiers between different device ecosystems.

FIG. 4 shows another embodiment of an environment 400 for mapping user identifiers between different device ecosystems. In this implementation, the environment 400 includes a mapping system 410 configured to communicate with one or more networks 412, and a personalized services or products component 415 configured to receive information from the mapping system 410 via the one or more networks 412 and to provide a tailored or customized service or product via the one or more networks 412. In at least some implementations, the mapping system 410 may be configured to perform the operations for mapping identifiers between different device ecosystems, however, in other implementations, one or more components or functionalities for mapping identifiers between different device ecosystems may be distributed to other portions of the environment 400 (e.g. mapping elements 420, 422) as described more fully below.

A first location (e.g. a home or residence location) 414 is associated with (or includes) a first network access IP1, and a second location (e.g. a work location) 416 is associated with (or includes) a second network access IP2. A first device PC1 having a first identifier ID1 is located at the first location 414 (e.g. home or residence) and may be used to access the first network access IP1 (e.g. a wireless router, a modem, a switch, a firewall, a network device, etc.) to access the one or more networks 412. Similarly, a second device PC2 having a second identifier ID2 is located at the second location 416 (e.g. work) and may be used to access the second network access IP2 to access the one or more networks 412. As further shown in FIG. 4, a User A may carry a mobile device M3 having a third identifier ID3, and may be located at the first location 414 during a first time period 415 (e.g. night-time or off-work hours as represented by a moon), and may also be located at the second location 416 during a second time period 417 (e.g. work hours as represented by a sun). Typically, in at least some implementations, the first device PC1 and the second device PC2 may operate with the same (or substantially similar) ecosystems, and the mobile device M3 may operate with an ecosystem that is different (or substantially different) than that of the first and second devices PC1, PC2.

In at least some implementations, one or more first mapping elements 420 may be associated with the first location 414. The one or more first mapping elements 420 may be hosted by (or disposed on) one or more of the first device PC1, the first network access IP1, the mobile device M3, or any other suitable device or component. Similarly, in at least some implementations, one or more second mapping elements 422 may be associated with the second location 416. The one or more second mapping elements 422 may be hosted by (or disposed on) one or more of the second device PC2, the second network access IP2, the mobile device M3, or any other suitable device or component. It will be appreciated that the one or more first and second mapping elements 420, 422 may (either individually or in cooperation with the mapping system 410) perform one or more of the operations or functions associated with mapping identifiers as described herein, including for example, one or more of the operations or functions of the mapping engine 150 (e.g. one or more of the IP address lookup component 152, the time determination component 154, the record keeping component 156, or the mapping component 158).

Using known techniques, the first and second identifiers ID1, ID2 may be mapped to and associated with the User A. More specifically, if the first device PC1 and the second device PC2 operate with the same ecosystems (or substantially similar ecosystems), then using known mapping techniques such as those disclosed in U.S. Pat. No. 8,843,394 issued to Cao et al., the identifier pair <ID1, ID2> may be associated with the User A. Then, in order to map the third identifier ID3 associated with the mobile device M3 (e.g. across multiple devices in different ecosystems) to the User A, techniques and technologies in accordance with the present disclosure use co-occurrence (or co-location), which refers to the occurrence of a pair of identifiers at the same IP address at the same time, but not necessary from the same devices.

In general, users may use PCs (desktops or laptops) operating within the same or similar ecosystems at work or at home (e.g. Microsoft identifiers in a Microsoft ecosystem, Apple identifiers in an Apple ecosystem, etc.). Therefore, through co-occurrence techniques and technologies disclosed herein, the identifier on a mobile device using a different ecosystem (e.g. Android) may be detected and mapped to identifiers on such home and work PCs, enabling mapping of pairs of identifiers together across different ecosystems.

More specifically, with reference to FIG. 4, the co-occurrence of identifiers at the first (or home) location 414 during the first time period (or off-work hours) 415 may result in a first (or home) co-occurrence 430. Similarly, the co-occurrence of identifiers at the second (or work) location 416 during the second time period (or work hours) 417 may result in a second (or work) co-occurrence 432. In at least some implementations, the first co-occurrence 430 may be determined using the one or more first mapping elements 420 associated with the first location 414, while the second co-occurrence 432 may be determined using the one or more second mapping elements 422 associated with the second location 416. The personalized services or products component 415 may receive the mapping information associating the third identifier ID3 with the User A from the mapping system 410, and may in turn provide a service or product via the one or more networks 412 to the mobile device M3 that is appropriately customized or tailored to the User A.

Figure 5A:
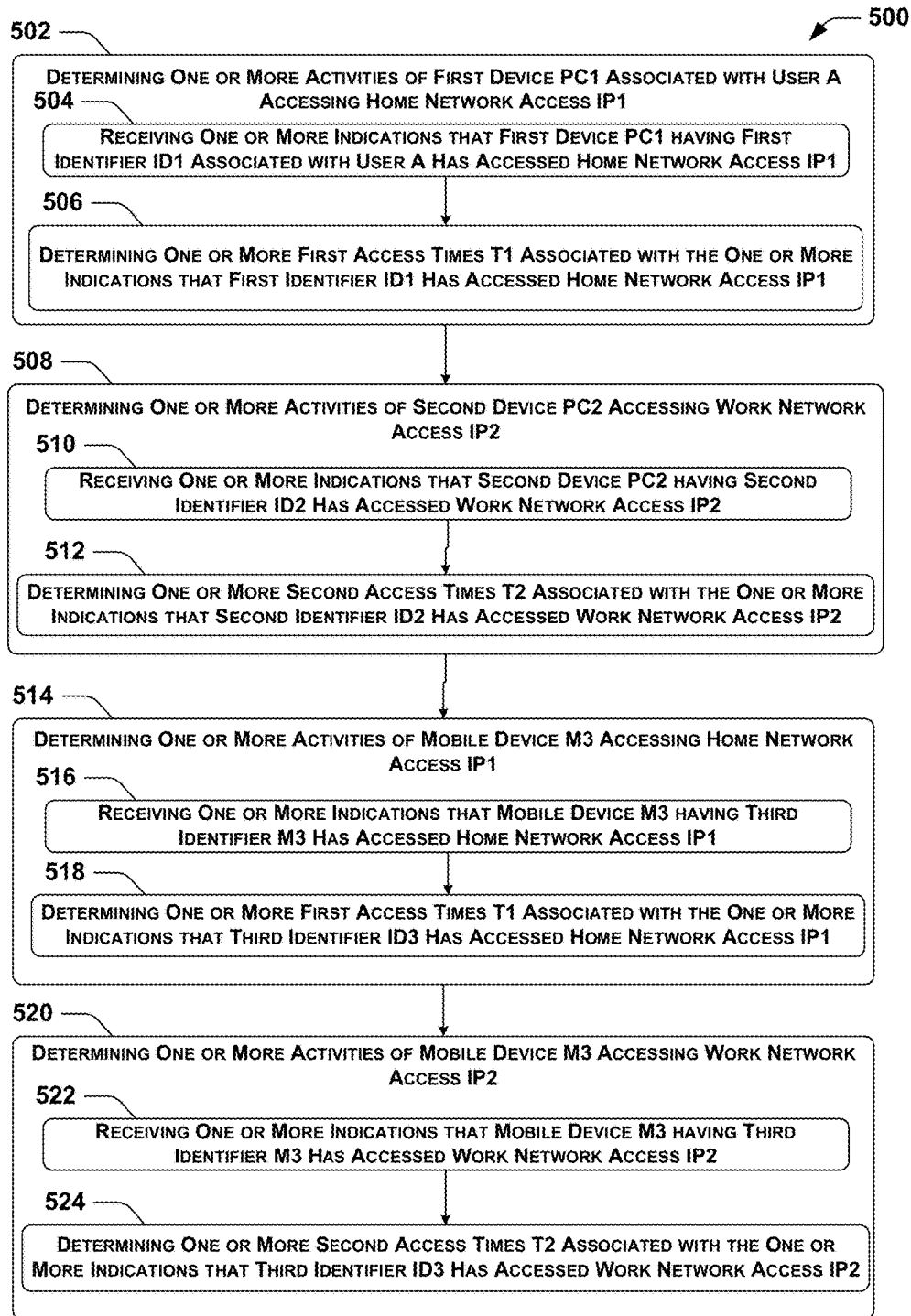
FIGS. 5A and 5B show another embodiment of a process for mapping user identifiers between different device ecosystems.
Figure 5B:
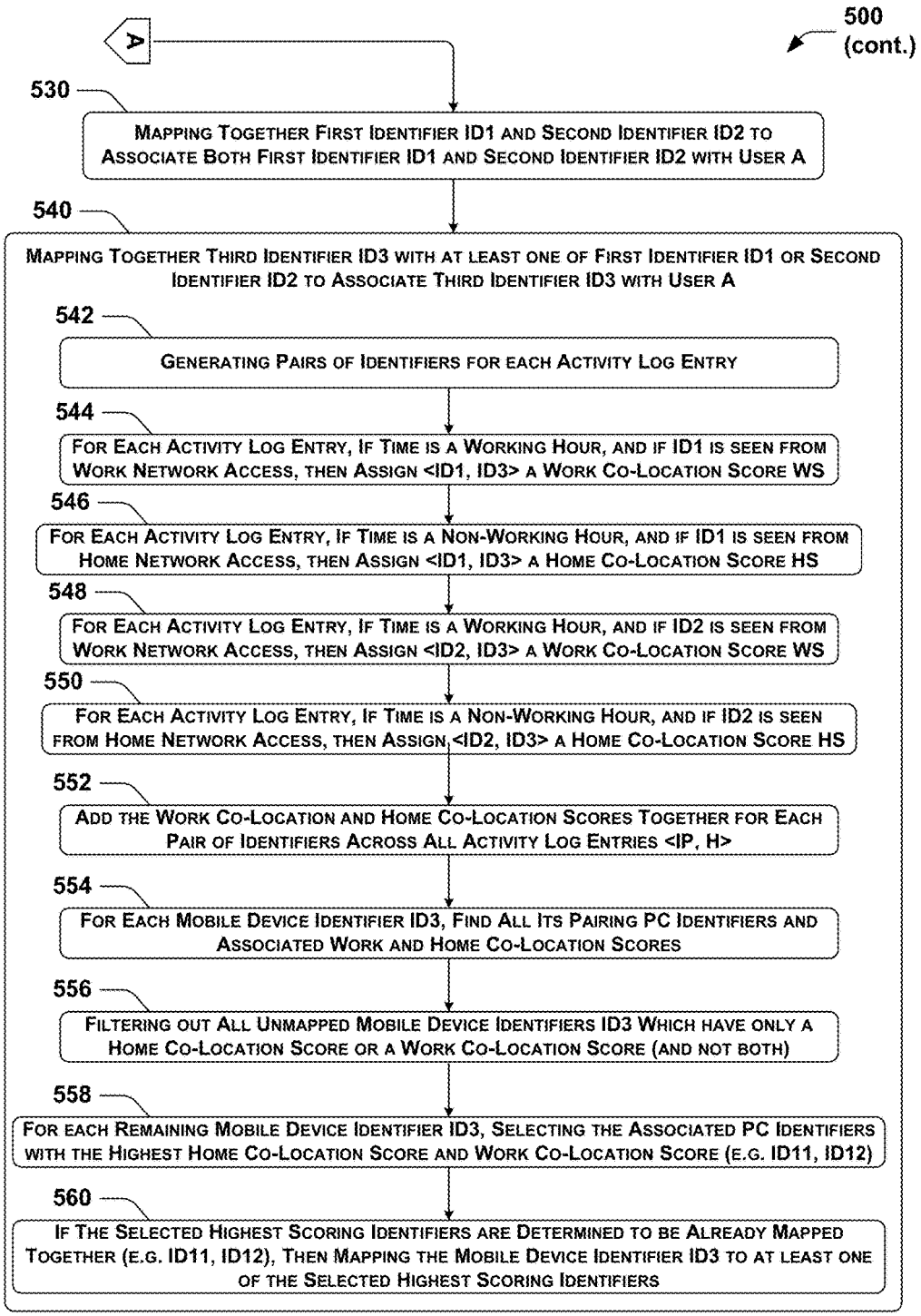

FIGS. 5A and 5B show another embodiment of a process 500 for mapping user identifiers between different device ecosystems. In this implementation, the process 500 describes operations associated with the environment 400 of FIG. 4 wherein the first location 414 is assumed to be a home or residence location, and the second location 416 is assumed to be a work or employment location. It will be appreciated, however, that in other implementations, any other suitable first and second locations may be employed.

As shown in FIG. 5A, in at least some implementations, the process 500 includes determining one or more activities of a first device PC1 associated with a User A accessing a home network access IP1 at 502. More specifically, in at least some implementations, determining one or more activities of a first device PC1 associated with a User A accessing a home network access IP1 at 502 may include receiving one or more indications that the first device PC1 having a first identifier ID1 associated with a User A has accessed the home network access IP1 at 504. For example, in a particular embodiment, the IP address lookup component 152 of the mapping engine 150 of the system 110 (or mapping system 410) may receive an indication that the first identifier ID1 associated with the User A has accessed the home network access IP1 using the first device ID1.

It will be appreciated that the first identifier ID1 may be associated with the User A in a variety of ways, including for example by prior registration of the User A and prior association of the User A with the first identifier ID1, and then storing of information associating User A with first identifier ID1 (e.g. storing into the mapping database 155). In at least some implementations, the IP address lookup component 152 of FIG. 2 may determine a first location (or area or region) associated with the home network access IP1. Information associated with the one or more indications (received at 504) that the first identifier ID1 associated with the User A has accessed the home network access IP1 may be stored within the mapping database 155 (e.g. by the mapping engine 150, mapping system 410, one or more first mapping elements 420, etc.).

Similarly, in at least some implementations, determining one or more activities of a first device PC1 associated with a User A accessing a home network access IP1 at 502 may also include determining one or more first access times T1 associated with the one or more indications that the first identifier ID1 associated with the User A has accessed the home network access IP1 at 506. For example, in a particular embodiment, the time determination component 154 of the mapping engine 150 of the system 110 (or system 410, or one or more first mapping elements 420) may determine one or more first access times T1 associated with the one or more indications (received at 504) that the first identifier ID1 associated with the User A has accessed the home network access IP1 to access one or more networks using the first device PC1. Information associated with the one or more first access times T1 (determined at 506) may be stored within the mapping database 155 (e.g. by the mapping engine 150, mapping system 410, one or more first mapping elements 420, etc.).

As further shown in FIG. 5A, in this implementation, the process 500 includes determining one or more activities of a second device PC2 accessing a work network access IP2 at 508. In at least some implementations, determining one or more activities of a second device PC2 accessing a work network access IP2 at 508 may include receiving one or more indications that the second device PC2 having a second identifier ID2 has accessed the work network access IP2 at 510. For example, in a particular embodiment, the IP address lookup component 152 of the mapping engine 150 of the system 110 (or mapping system 410, or one or more second mapping elements 422) may receive an indication that the second identifier ID2 has accessed the work network access IP2 using the second device PC2.

Similarly, in at least some implementations, determining one or more activities of a second device PC2 accessing a work network access IP2 at 508 may also include determining one or more second access times T2 associated with the one or more indications that the second identifier ID2 has accessed the work network access IP2 at 512. For example, in a particular embodiment, the time determination component 154 of the mapping engine 150 of the system 110 (or system 410, or one or more second mapping elements 422) may determine one or more second access times T2 associated with the one or more indications (received at 510) that the second identifier ID2 has accessed the work network access IP2 to access one or more networks using the second device PC2. Information associated with the one or more second access times T2 (determined at 512) may be stored within the mapping database 155 (e.g. by the mapping engine 150, mapping system 410, one or more second mapping elements 422, etc.).

With continued reference to FIG. 5A, in at least some implementations, the process 500 may include determining one or more activities of a mobile device M3 accessing the home network access IP1 at 514. In at least some implementations, determining one or more activities of a mobile device M3 accessing the home network access IP1 at 514 may include receiving one or more indications that the mobile device M3 having a third identifier ID3 has accessed the home network access IP1 at 516. For example, in a particular embodiment, the IP address lookup component 152 of the mapping engine 150 of the system 110 (or mapping system 410, or one or more first mapping elements 420) may receive an indication that the third identifier ID3 has accessed the home network access IP1 using the mobile device ID3.

Furthermore, in at least some implementations, determining one or more activities of a mobile device M3 accessing the home network access IP1 at 514 may also include determining one or more first access times T1 associated with the one or more indications that the third identifier ID3 has accessed the home network access IP1 at 518. For example, in a particular embodiment, the time determination component 154 of the mapping engine 150 of the system 110 (or system 410, or one or more first mapping elements 420) may determine one or more first access times T1 associated with the one or more indications (received at 516) that the third identifier ID3 has accessed the home network access IP1 to access one or more networks using the mobile device M3. Information associated with the one or more first access times T1 (determined at 516) may be stored within the mapping database 155 (e.g. by the mapping engine 150, mapping system 410, one or more first mapping elements 420, etc.).

As further shown in FIG. 5A, in at least some implementations, the process 500 may include determining one or more activities of the mobile device M3 accessing the work network access IP2 at 520. In at least some implementations, determining one or more activities of a mobile device M3 accessing the work network access IP2 at 520 may include receiving one or more indications that the mobile device M3 having a third identifier ID3 has accessed the work network access IP2 at 522. For example, in a particular embodiment, the IP address lookup component 152 of the mapping engine 150 of the system 110 (or mapping system 410, or one or more second mapping elements 422) may receive an indication that the third identifier ID3 has accessed the work network access IP2 using the mobile device M3.

Furthermore, in at least some implementations, determining one or more activities of a mobile device M3 accessing the work network access IP2 at 520 may also include determining one or more second access times T2 associated with the one or more indications that the third identifier ID3 has accessed the work network access IP2 at 524. For example, in a particular embodiment, the time determination component 154 of the mapping engine 150 of the system 110 (or system 410, or one or more first mapping elements 420) may determine one or more second access times T2 associated with the one or more indications (received at 522) that the third identifier ID3 has accessed the work network access IP2 to access one or more networks using the mobile device M3. Information associated with the one or more second access times T2 (determined at 524) may be stored within the mapping database 155 (e.g. by the mapping engine 150, mapping system 410, one or more second mapping elements 422, etc.).

With reference to FIG. 5B, in at least some implementations, the process 500 may further include mapping together the first identifier ID1 and the second identifier ID2 to associate both the first identifier ID1 and the second identifier ID2 with the User A at 530. As noted above, in at least some implementations, the mapping of the first and second identifiers ID1, ID2 (at 530) may be accomplished using a known mapping algorithm to associate both the first identifier ID1 and the second identifier ID2 with the User A (i.e. A={ID1, ID2}) as disclosed, for example, in U.S. Pat. No. 8,843,394 issued to Cao et al. In at least some implementations, the mapping of the first and second identifiers ID1, ID2 (at 530) may employ a known algorithm as described more fully below with reference to FIG. 6.

As further shown in FIG. 5B, the process 500 further includes mapping together the third identifier ID3 with at least one of the first identifier ID1 or the second identifier ID2 to associate the third identifier ID3 with the User A at 540. In at least some implementations, the mapping together of the third identifier ID3 with at least one of the first identifier ID1 or the second identifier ID2 to associate the third identifier ID3 with the User A (at 540) may include determining a plurality of first co-location occurrences of the third identifier ID3 with at least one of the first identifier ID1 or the second identifier ID2. For example, a first co-location occurrence may include an instance or occurrence of the third identifier ID3 accessing the first network access IP1 within a first time period (or contemporaneously with) at least one of the first identifier ID1 or the second identifier ID2. Similarly, in at least some implementations, the mapping together of the third identifier ID3 with at least one of the first identifier ID1 or the second identifier ID2 to associate the third identifier ID3 with the User A (at 540) may include determining a plurality of second co-location occurrences of the third identifier ID3 with at least one of the first identifier ID1 or the second identifier ID2. For example, a second co-location occurrence may include an instance or occurrence of the third identifier ID3 accessing the second network access IP2 within a second time period (or contemporaneously with) at least one of the first identifier ID1 or the second identifier ID2.

More specifically, in at least some implementations, mapping together the third identifier ID3 with at least one of the first identifier ID1 or the second identifier ID2 to associate the third identifier ID3 with the User A (at 540) may include generating pairs of identifiers for each activity log entry (e.g. <IP address, time H>) at 542 so that the two identifiers in the pair (e.g. <ID1, ID3>) are in the value field of the activity log entry, and one of the identifiers in the pair is an identifier on a device that has been associated with the User A (e.g. ID1, ID2) and the other identifier is the third identifier ID3 of the mobile device M3.

Further, the mapping (at 540) may include processing all identifier pairs in the form of <PC identifier, mobile identifier> that are present in the activity log entries (e.g. ID1, ID2, ID3 may not yet be known). In at least some implementations, the processing (at mapping 540) helps to find the pairs of <ID1, ID3> or <ID2, ID3> from a large number of possible ID pairs as the pairs belonging to the same user A will have high co-location occurrence scores at the first location or the second location (or both) (e.g. WS or HS scores). Therefore, while the following description discusses the processing of <ID1, ID3> and <ID2, ID3> for each activity log entry <IP, H>, and the assigning of first co-location occurrence scores (e.g. WS) and second co-location occurrence scores (e.g. HS) to the identifier pairs <ID1, ID3> and <ID2, ID3>, it will be appreciated that in at least some implementations, all identifier pairs in the <PC identifier, mobile identifier> that are present in the log entries are processed in this manner in order to determine the pairs of <ID1, ID3> or <ID2, ID3> from a large number of possible ID pairs.

For example, in at least some implementations, the mapping (at 540) includes, for each activity log entry, if time H is a working hour (e.g. occurs during second time period 417), and if the first identifier ID1 is seen on the work network access IP2 at the work location 416, then the process 500 may assign to the identifier pair <ID1, ID3> a Work Co-location score WS at 544. Similarly, for each activity log entry, if time H is a non-working hour (e.g. occurs during first time period 415), and if the first identifier ID1 is seen on the home network access IP1 at the home location 414, then the process 500 may assign to (or increment) the identifier pair <ID1, ID3> a Home Co-location score HS at 546.

With continued reference to FIG. 5B, the mapping (at 540) may also include, for each activity log entry, if time H is a working hour (e.g. occurs during second time period 417), and if the second identifier ID2 is seen on the work network access IP2 at the work location 416, then the process 500 may assign to (or increment) the identifier pair <ID2, ID3> a Work Co-location score WS at 548. Similarly, for each activity log entry, if time H is a non-working hour (e.g. occurs during first time period 415), and if the second identifier ID2 is seen on the home network access IP1 at the home location 414, then the process 500 may assign to (or increment) the identifier pair <ID2, ID3> a Home Co-location score HS at 550. As noted above, the assigning (or incrementing) of Work Co-location scores and Home Co-location scores may be performed for all identifier pairs in the form of <PC identifier, mobile identifier> that are present in the activity log entries.

In at least some implementations, the mapping (at 540) may further include adding the Work Co-location and Home Co-location scores together for each pair of identifiers across all activity log entries <IP, H> at 552. The mapping (at 540) may further include, for each mobile device identifier ID3, finding all of its pairing PC identifiers (e.g. ID1 of PC1, ID2 of PC2, etc.) and associated Work Co-location (WS) and Home Co-location (HS) scores at 554. In at least some implementations, the results (at 554) may appear as follows: ID3: ID11 HS1, ID12 WS1, ID13 WS2, ID14 HS2 WS3, which may be interpreted as the identifier pair <ID11, ID3> has a Home Co-location score of HS1, the identifier pair <ID12, ID3> has a Work Co-location score of WS1, the identifier pair <ID13, ID3> has a Work Co-location score of WS2, and the identifier pair <ID14, ID3> has a Home Co-location score of HS2 and Work Co-location score of WS3.

Next, in at least some implementations, the mapping (at 540) may also include filtering out all unmapped mobile device identifiers ID3 which have only a Home Co-location score (HS) or a Work Co-location score (WS) (and not both) at 556. In other words, for any unmapped identifiers only seen in identifier pairs only associated with one of the first co-location occurrence score or the second co-location occurrence score, such unmapped identifiers associated with such identifier pairs are filtered out (at 556). The filtering (at 556) may advantageously improve the accuracy of a subsequent association of a mobile device identifier ID3 with the User A by requiring co-location scores at multiple locations (e.g. home and work locations), thereby improving system efficiencies and reducing resource usage (e.g. processing requirements, power consumption, storage requirements, etc).

As further shown in FIG. 5B, the mapping (at 540) may further include, for each remaining mobile device identifier ID3 (that is not filtered during the filtering at 556), selecting the associated PC identifiers with the highest work co-location score WS and home co-location score HS at 558. If the selected highest scoring identifiers (e.g. assume ID11 and ID12 are selected at 558) are determined to be already mapped together (e.g. during the mapping operations at 530), then the mapping (at 540) may further include mapping the mobile device identifier ID3 to at least one of the selected highest scoring identifiers (e.g. ID11, or ID12, or both). Thus, as a result of the mapping together the third identifier ID3 with at least one of the first identifier ID11 or the second identifier ID12 to associate the third identifier ID3 with the User A (at 540), the set of identifiers <ID11, ID12, ID3> stands for the same person (e.g. User A).

As noted above, techniques and technologies for mapping user identifiers between different device ecosystems may provide substantial operational improvements in comparison with conventional operations. For example, such techniques and technologies enable appropriately tailored personalization services or products to be provided to a user of a device, thereby reducing or eliminating unnecessary processing requirements or energy consumption or other resource usage (e.g. consumption of transmission bandwidth, wear and tear on infrastructure, loss of opportunity considerations, etc.) associated with repeated delivery of inappropriate personalization services, or repeated attempts to determine (or re-determine) an identity of a user of a mobile device. Because the techniques and technologies for mapping user identifiers as disclosed herein may even be employed between different device ecosystems, such techniques and technologies may operate more efficiently with fewer computational operations required to achieve the desired result, with reduced resource usage (e.g., less memory usage, less power consumption, etc.), and with less strain on infrastructure (e.g. reduced bandwidth usage, and less wear and tear on infrastructure associated with incorrect or inappropriate operations, etc.) in comparison with conventional techniques and technologies.

Figure 6:
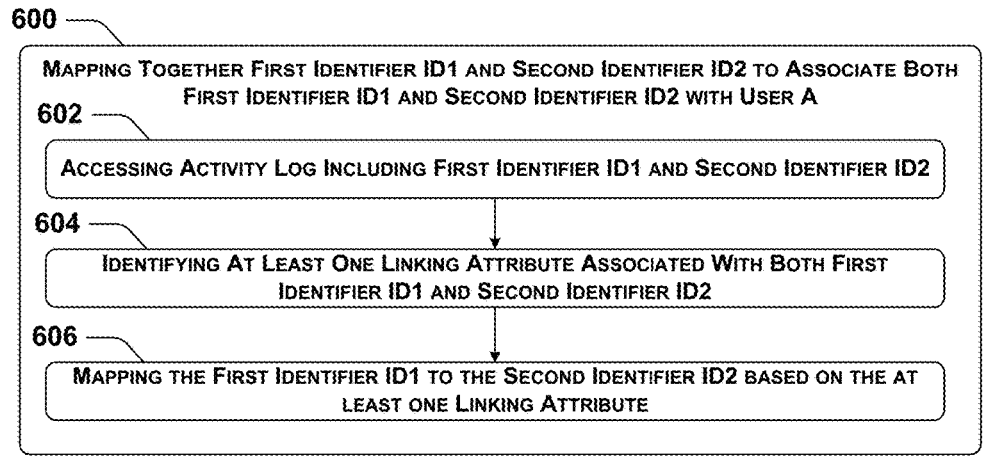
FIG. 6 shows an embodiment of a process 600 for mapping together a first identifier and a second identifier to associate both the first identifier and the second identifier with a user.

As noted above, processes for mapping together first and second identifiers from devices having the same (or substantially similar) device ecosystems are generally known, as disclosed, for example, in U.S. Pat. No. 8,843,394 issued to Cao et al. For example, FIG. 6 shows an embodiment of a process 600 for mapping together a first identifier ID1 and a second identifier ID2 to associate both the first identifier ID1 and the second identifier ID2 with a user A. In at least some implementations, the mapping of the first and second identifiers ID1, ID2 (at 600) may include accessing an activity log including the first identifier ID1 and the second identifier ID2 at 602, identifying at least one linking attribute associated with both the first identifier ID1 and the second identifier ID2 at 604, and mapping the first identifier ID1 to the second identifier ID2 based on the at least one linking attribute at 606. Additional aspects of the operations associated with mapping of the first and second identifiers ID1, ID2 (at 600) are discussed below.

In at least some implementations, the activity logs may include various activities, or events, that have been recognized and may be referred to herein as log schema. The log schema may automatically be translated to any recognized job script. In at least some implementations, activity logging criteria may be established by an internet service provider, an advertiser, or any other entity that may desire to record activity logs. Exemplary activities may include, but are not limited to, a search query input, a browsing session, a page-view, a selection of an item within a page-view, or the like. Along with criteria for the recognition of activities, criteria may also be established for organizing activities within the activity log. For example, each event may be designated on a different line of the activity log, identifiers with similar properties may be designated on the same line of the activity log, events that are the same may be designated on the same line, or the like.

In at least some implementations, the activity log may include registered or unregistered identifiers associated with each event within the activity log. Identifiers may be associated with more than one event. For instance, a registered identifier ID1 for the User A may be associated with a browse session of User A and a search input of User A. Both the browse session and the search event may be recognized as different events but are associated with the same User A. Thus, the registered identifier ID1 may be the same for each event. Alternatively, the same User A may be associated with a different identifier, either registered or unregistered. For instance, User A may have more than one account (e.g. MSN passport account) and may sign in using a second password identifier. Thus, the two events may be associated with two different registered identifiers belonging to the same user (User A).

The identifiers, whether registered identifiers or unregistered identifiers, may be associated with configurations detailing properties of each identifier. Exemplary properties include, but are not limited to, a lifetime of the identifier, a source of the identifier, or the like. In at least some implementations, the mapping engine 150 (e.g. the mapping component 158) of FIG. 2 may be configured to identify the identifiers that are included in the accessed activity log (e.g. generated by the record keeping component 156). In various implementations, the activity log may include a single type of identifier or multiple types of identifiers. For example, in at least some implementations, an identifier may be a device identifier, a password identifier, or any other suitable type of identifier.

For instance, assume the following is an activity log that is accessed by the mapping engine 150:

Example 1

Line 1: A1, A2
Line 2: A2, A3
Line 3: A3, A4

In Example 1 above, the type of identifier (e.g., password, device, etc.) is designated by the letter "A". Thus, in the implementation shown in Example 1, each identifier is assumed to be Type A. In at least some implementations, a single line of the activity log includes at least two identifiers. For the purposes of Example 1, assume that Line 1 includes two identifiers illustrated as A1 and A2. For example, A1 may be a first identifier and A2 may be a second identifier. The mapping engine 150 may be configured to identify that two identifiers are on the same line of an activity log. When two identifiers are on the same line of an activity log, it may be assumed that the identifiers are generated from the same event related to a single user.

In at least some implementations, the mapping engine 150 (e.g. the mapping component 158) may be configured to identify linking attributes of identifiers. A linking attribute is an attribute that is common to multiple identifiers and is used to map the identifiers sharing the linking attribute to one another. Examples of linking attributes include, but are not limited to, identifiers positioned on the same line of an activity log, identifiers appearing in the same browser session, identifiers that are associated with the same user, identifiers that are associated with the same IP address, or the like. When a linking attribute is identified, at least part of the mapping engine 150 may proceed with mapping, or correlating, the identifiers sharing the linking attribute to one another. The identifiers sharing the linking attribute may both be registered identifiers, unregistered identifiers, or one may be a registered identifier while the other is an unregistered identifier. In at least some implementations, the mapping engine 150 is configured to map any identifier to any other identifier by grouping the identifiers into correlation output lines.

In the Example 1 above, assume that identifiers A1 and A2 are a first password identifier A1 registered to User 1 and a second password identifier A2 registered to User 1, respectively. Both password identifiers may be identified as sharing a linking attribute (e.g., both are associated with user 1). Thus, the two registered identifiers may be mapped to one another, and any user profile information and/or behavior information associated with each of identifiers A1 and A2 may be, in turn, associated with both identifiers A1 and A2.

Assuming that identifier A1, of Example 1, is a registered password identifier and A2 is an unregistered identifier, the identifying component may identify that A1 and A2 share a linking attribute (e.g., both are included on line 1 of the activity log). The two identifiers may then be mapped to one another. Once identified as sharing a linking attribute, the mapping component 243 may map A1 and A2 to one another.

In as least some implementations, a subsequent line of the activity log may then be analyzed to identify any identifiers that include a linking attribute with any identifiers of Line 1. If a subsequent line includes at least one identifier having a linking attribute with at least one identifier of the previous line, the mapping engine 150 (e.g. mapping component 158) is configured to combine the identifiers one line at a time. For example, assume that identifier A2 and identifier A3 share a linking attribute. In that situation, lines 1 and 2 are combined to output identifiers A1, A2, A3 as a first correlation output line, or a first resulting line.

In addition, in at least some implementations, a first resulting line may be combined with Line 3 to output identifiers A1, A2, A3, A4 as a second resulting line if Line 3 includes at least one identifier sharing a linking attribute with at least one identifier from the first resulting line. Additionally, one or more resulting lines may be combined with one or more subsequent lines when there is at least one merging identifier or an overlapping identifier. For instance, in the example above, the first resulting line and Line 3 each included identifier A3. Identifier A3 is, in turn, recognized as an overlapping identifier. The combinations may continue until the last line of the activity log is combined.

In addition, in at least some implementations, when an activity log includes multiple types of identifiers in a single line, the mapping engine 150 (e.g. mapping component 158) may be configured to identify each type of identifier and combine the identifiers one line at a time and one identifier type at a time when there are at least two identifiers in the activity event line. For example, with reference to Example 2 shown below, assume the activity log is accessed by the mapping engine 150 (e.g. mapping component 158) and that identifiers A1 and A2 are identifiers registered to the same user.

Example 2

Line 1: A1, A2; B1, B2
Line 2: A1, A3; B3, B4
Line 3: A5, A6; B3

In this embodiment, Example 2 illustrates Type A and Type B identifiers included in a single line of an activity log. Initially, a determination is made whether the initial lines have an overlapping identifier. If there is an overlapping identifier, the two lines may be merged. In Example 2 above, both Lines 1 and 2 include identifier A1. Identifier A1 is, thus, the overlapping identifier. If there is no overlapping identifier, the two lines are not immediately merged. The two lines may still be merged together if, for example, one identifier from each line shares a linking attribute.

In at least some implementations, based on a determination that Lines 1 and 2 include an overlapping identifier, Lines 1 and 2 may be combined based on identifier type. Accordingly, identifier type A is combined first and identifier type B is combined second. Assuming that Line 1 includes two registered identifiers (i.e., identifiers A1 and A2), the identifying component 242 identifies that any unregistered identifiers in that activity line (i.e., Line 1) may be mapped to the registered identifiers by the mapping engine 150 (e.g. mapping component 158). Alternatively, if Line 1 included only registered identifiers or only unregistered identifiers, all of the identifiers included in Line 1 may still be mapped to one another by the mapping engine 150 (e.g. mapping component 158) if a linking attribute is identified.

When Lines 1 and 2 are combined the combination of Type A identifiers results as identifiers A1, A2, A3 and the combination of Type B identifiers results as identifiers B1, B2, B3, B4. Thus, the resulting first output line is identifiers A1, A2, A3; B1, B2, B3, B4 illustrating the combination of the Type A identifiers and then the combination of the Type B identifiers.

Next, in at least some implementations, the mapping engine 150 (e.g. mapping component 158) determines if the first output line and the subsequent activity line include an overlapping identifier. In Example 2, the first output line and Line 3 are identified by the mapping engine 150 (e.g. mapping component 158) as both including identifier 133. The first output line may then be combined with Line 3. Again, the Type A identifiers may be combined initially and may be followed by the combination of Type B identifiers or vice versa. Accordingly, the combination of the Type A identifiers would be identifiers A1, A2, A3, A5, A6 and the combination of the Type B identifiers would be identifiers B1, B2, B3, B4. Thus, the resulting second output line would be identifiers A1, A2, A3, A5, A6; B1, B2, B3, B4. The combinations may continue in this manner until the last line of the activity log is reached.

In at least some implementations, the mapping engine 150 (e.g. mapping component 158) may identify if a linking attribute is present as an alternative, or in addition, to an overlapping identifier. Thus, even if there is no overlapping identifier, the subsequent line may still be merged into the preceding or resulting line if at least one identifier from each line shares a linking attribute. Once the identifiers are mapped and combined into a correlated output line, the mapping engine 150 (e.g. mapping component 158) outputs the correlated output line.

Besides automatically mapping identifiers based on a location within an activity log line, alternate implementations of the present disclosure may map identifiers based on alternative criteria. For example, identifiers may be mapped to any other identifier based on properties of identifiers. For example, a property of an identifier may be an identifier's "lifetime" (or useable life) and may be used as a factor in the correlation of identifiers. Additionally, user properties may also be a factor in the correlation of identifiers. For instance, a user may have various properties across several devices such as, for example, a home computer and a mobile phone.

Referring again to FIGS. 4-5, once the mapping of the first, second, and third identifiers ID1, ID2, ID3 (at 500) is complete, the output generated may be utilized to create an increased targeted audience for customized personalization services or products (e.g. advertisements). In at least some implementations, the number of identifiers that are associated with user information may increase as a result of mapping identifiers. Thus, a target audience for personalized services or products may also be larger than before the identifiers were mapped. Additionally, more information is available to generate personalized services or products for a target group of identifiers since information and/or behavior for each of the plurality of identifiers with the target group is available to customize the personalized services or products once the plurality of identifiers are mapped together.

Techniques and technologies disclosed herein for mapping user identifiers between different device ecosystems may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments where tasks are performed by remote-processing devices that are linked through a communications network.

Figure 7:
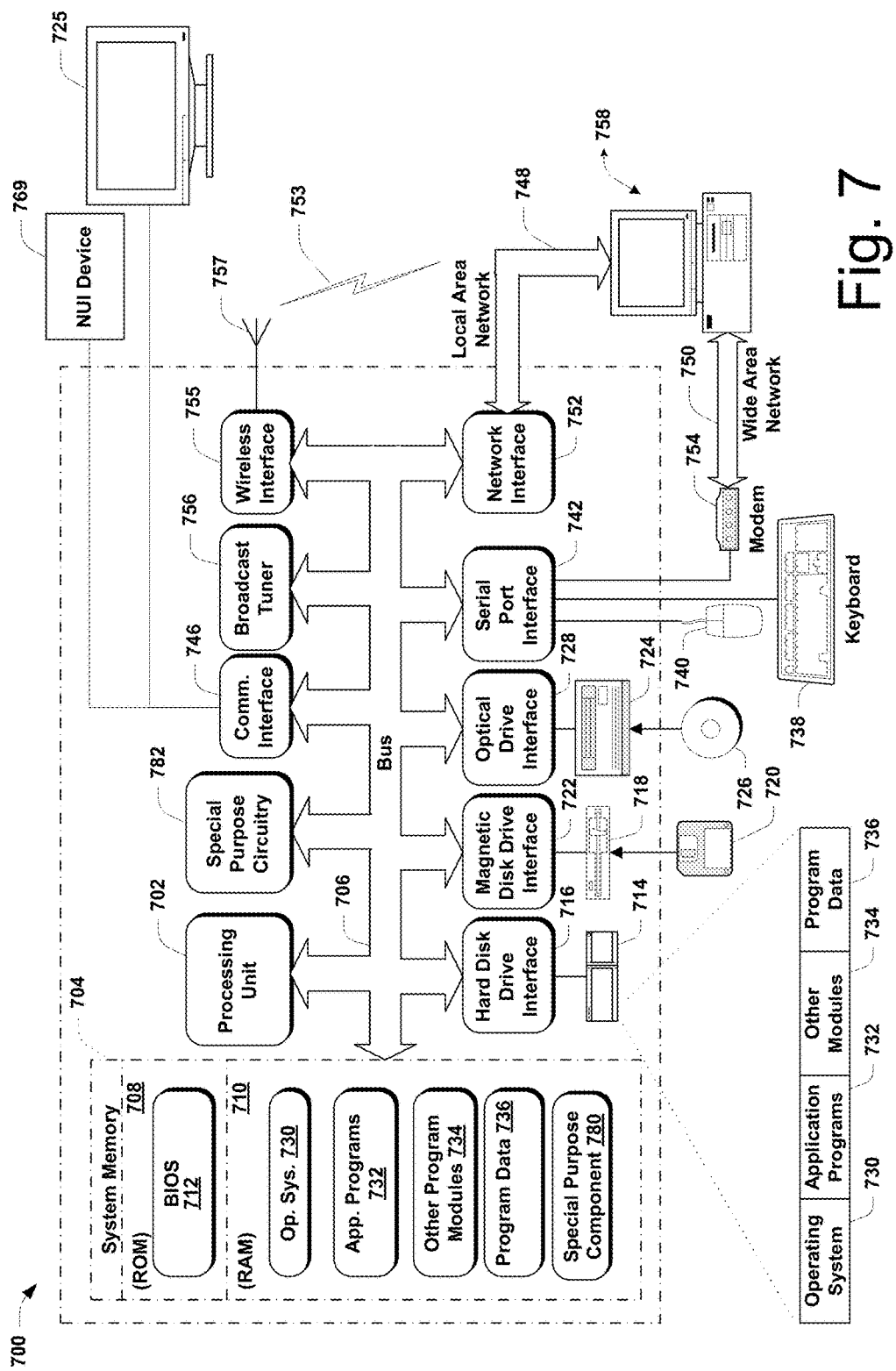
FIG. 7 shows an embodiment of a computer system for mapping user identifiers between different device ecosystems.

Furthermore, techniques and technologies disclosed herein for mapping user identifiers between different device ecosystems may be implemented on a wide variety of devices and platforms. For example, FIG. 7 is a diagram of an embodiment of a computer system environment 700 that may be employed for mapping user identifiers between different device ecosystems. As shown in FIG. 7, the example computer system environment 700 includes one or more processors (or processing units) 702, special purpose circuitry 782, memory 704, and a bus 706 that operatively couples various system components, including the memory 704, to the one or more processors 702 and special purpose circuitry 782 (e.g., ASIC, FPGA, etc.).

The bus 706 may represent one or more of any of several types of bus structures, including a memory bus or memory controller, a peripheral bus, an accelerated graphics port, and a processor or local bus using any of a variety of bus architectures. In at least some implementations, the memory 704 includes read only memory (ROM) 708 and random access memory (RAM) 710. A basic input/output system (BIOS) 712, containing the basic routines that help to transfer information between elements within the system 700, such as during start-up, is stored in ROM 708.

The example system environment 700 further includes a hard disk drive 714 for reading from and writing to a hard disk (not shown), and is connected to the bus 706 via a hard disk driver interface 716 (e.g., a SCSI, ATA, or other type of interface). A magnetic disk drive 718 for reading from and writing to a removable magnetic disk 720, is connected to the system bus 706 via a magnetic disk drive interface 722. Similarly, an optical disk drive 724 for reading from or writing to a removable optical disk 726 such as a CD ROM, DVD, or other optical media, connected to the bus 706 via an optical drive interface 728. The drives and their associated computer-readable media may provide nonvolatile storage of computer readable instructions, data structures, program modules and other data for the system environment 700. Although the system environment 700 described herein employs a hard disk, a removable magnetic disk 720 and a removable optical disk 726, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 700 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 7, a number of program modules may be stored on the memory 704 (e.g., the ROM 708 or the RAM 710) including an operating system 730, one or more application programs 732, other program modules 734, and program data 736 (e.g., the data store 720, image data, audio data, three dimensional object models, etc.). Alternately, these program modules may be stored on other computer-readable media, including the hard disk, the magnetic disk 720, or the optical disk 726. For purposes of illustration, programs and other executable program components, such as the operating system 730, are illustrated in FIG. 7 as discrete blocks, although it is recognized that such programs and components reside at various times in different storage components of the system environment 700, and may be executed by the processor(s) 702 or the special purpose circuitry 782 of the system environment 700.

A user may enter commands and information into the system environment 700 through input devices such as a keyboard 738 and a pointing device 740. Other input devices (not shown) may include a microphone, joystick, game pad, satellite dish, scanner, or the like. Still other input devices, such as a Natural User Interface (NUI) device 769, or user interface 725, include or involve one or more aspects of a Natural User Interface (NUI) that enables a user to interact with the system environment 700 in a "natural" manner, free from artificial constraints imposed by conventional input devices such as mice, keyboards, remote controls, and the like. For example, in at least some embodiments, the NUI device 769 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 702 and special purpose circuitry 782 through an interface 742 or a communication interface 746 (e.g. video adapter) that is coupled to the system bus 706. A user interface 725 (e.g., display, monitor, or any other user interface device) may be connected to the bus 706 via an interface, such as a video adapter 746. In addition, the system environment 700 may also include other peripheral output devices (not shown) such as speakers and printers.

The system environment 700 may operate in a networked environment using logical connections to one or more remote computers (or servers) 758. Such remote computers (or servers) 358 may be a personal computer, a server, a router, a network PC, a peer device or other common network node. The logical connections depicted in FIG. 7 include one or more of a local area network (LAN) 748 and a wide area network (WAN) 750. Such networking environments are commonplace in offices, enterprise-wide computer networks, intranets, and the Internet. In this embodiment, the system environment 700 also includes one or more broadcast tuners 756. The broadcast tuner 756 may receive broadcast signals directly (e.g., analog or digital cable transmissions fed directly into the tuner 756) or via a reception device (e.g., via an antenna 757, a satellite dish, etc.).

When used in a LAN networking environment, the system environment 700 may be connected to the local area network 748 through a network interface (or adapter) 752. When used in a WAN networking environment, the system environment 700 typically includes a modem 754 or other means (e.g., router) for establishing communications over the wide area network 750, such as the Internet. The modem 754, which may be internal or external, may be connected to the bus 706 via the serial port interface 742. Similarly, the system environment 700 may exchange (send or receive) wireless signals 753 with one or more remote devices using a wireless interface 755 coupled to a wireless communicator 757 (e.g., an antenna, a satellite dish, a transmitter, a receiver, a transceiver, a photoreceptor, a photodiode, an emitter, a receptor, etc.).

In a networked environment, program modules depicted relative to the system environment 700, or portions thereof, may be stored in the memory 704, or in a remote memory storage device. More specifically, as further shown in FIG. 7, a special purpose component 780 may be stored in the memory 704 of the system environment 700. The special purpose component 780 may be implemented using software, hardware, firmware, or any suitable combination thereof. In cooperation with the other components of the system environment 700, such as the processing unit 702 or the special purpose circuitry 782, the special purpose component 780 may be operable to perform one or more implementations of techniques for mapping user identifiers between different device ecosystems as described above (e.g., example process 300 of FIG. 3, example process 500 of FIGS. 5A-5B, example process 600 of FIG. 6, etc.) (e.g., speech recognition component, gesture recognition component, touch recognition component, biometric identification component, etc. or combinations thereof).

Generally, application programs and program modules executed on the system environment 700 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

Figure 8:
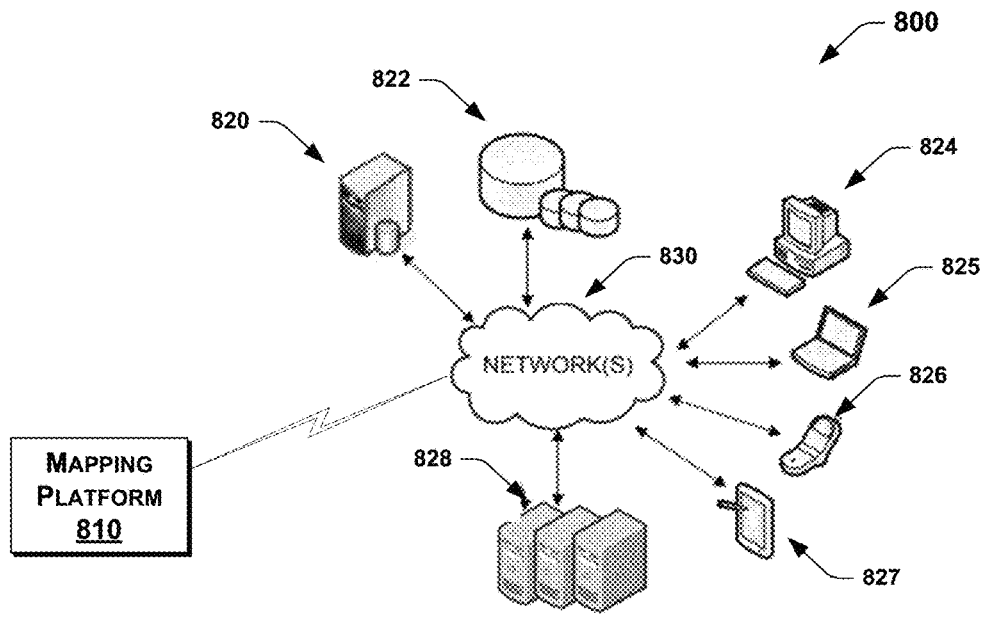
FIG. 8 shows an embodiment of a networked environment for mapping user identifiers between different device ecosystems.

FIG. 8 shows an embodiment of a networked environment 800 for mapping user identifiers between different device ecosystems. The networked environment 800 shown in FIG. 8 may include one or more of the various components or aspects described above with respect to FIGS. 1-7 (or shown or described elsewhere herein).

In this embodiment, the example networked environment 800 includes a mapping platform 810. The networked environment 800 may also include one or more database servers 820, data stores 822, desktop computers 824, laptop computers 825, communication devices 826 (e.g., cell phones, smart phones, personal data assistants, etc.), tablet (or notebook) computers 827, and servers 828, and such devices may be operatively coupled to the mapping platform 810 via one or more networks 830 (e.g., a LAN, WAN, a local communication system, a global communication system, the Internet, a cellular communication system, a telephonic communication system, etc.).

In at least some implementations, the mapping platform 810 may be configured to perform one or more of the mapping operations described above, including the processes and operations described above with reference to FIGS. 1-7. In at least some other implementations, one or more of the processes and operations described herein may be distributed among the mapping platform 810 and the other devices 820-830 of the networked environment 800.

The one or more networks 830 may comprise any suitable topology of servers, clients, Internet service providers, or other suitable communication media, and in various alternate implementations, may have a static or dynamic topology. The one or more networks 830 may include a secure network (e.g., an enterprise network), an unsecure network (e.g., a wireless open network, the Internet, etc.), and may also coordinate communication over other networks (e.g., PSTN, cellular networks, etc.). By way of example, and not limitation, the one or more networks 830 may be coupled by any suitable communication technologies, including, for example, electromagnetic signals, acoustic signals, RF signals, infrared signals and any other suitable communication technologies or signals.

In view of the disclosure of techniques and technologies for mapping user identifiers between different device ecosystems provided herein, a few representative embodiments are summarized below. It should be appreciated that the following summary of representative embodiments is not intended to be exhaustive of all possible embodiments, and that additional embodiments may be readily conceived from the disclosure of techniques and technologies for mapping user identifiers between different device ecosystems provided herein.

For example, in at least some embodiments, a system for mapping at least one of a first identifier or a second identifier with a third identifier, the first and second identifiers being associated with a user and with a first device ecosystem, the third identifier being associated with a second device ecosystem different from the first device ecosystem, the system may include a processing component operatively coupled to a memory, and a mapping engine at least partially disposed in the memory. In at least some embodiments, the mapping engine may be configured to map the third identifier associated with the second device ecosystem with at least one of the first identifier or the second identifier, the mapping being based at least partially on (i) a plurality of first co-location occurrences of the third identifier with the first identifier, and (ii) a plurality of second co-location occurrences of the third identifier with the second identifier. In at least some embodiments, the mapping engine may be further configured to provide an indication of an association of the third identifier with the user.

In at least some embodiments, the plurality of first co-location occurrences comprises a plurality of instances of the third identifier and the first identifier accessing a first network access, and wherein the plurality of second co-location occurrences comprises a plurality of instances of the third identifier and the second identifier accessing a second network access. Similarly, in at least some embodiments, the plurality of first co-location occurrences comprises a plurality of instances of the third identifier and the first identifier accessing a first network access within a first time period, and wherein the plurality of second co-location occurrences comprises a plurality of instances of the third identifier and the second identifier accessing a second network access within a second time period. Additionally, in at least some embodiments, the plurality of first co-location occurrences comprises a plurality of instances of the third identifier and the first identifier contemporaneously accessing a first network access, and the plurality of second co-location occurrences comprises a plurality of instances of the third identifier and the second identifier contemporaneously accessing a second network access.

In addition, in at least some embodiments, the first device ecosystem comprises an ecosystem associated with at least one of a personal computer, a desktop computer, a laptop computer, a server, a data store, a communication device, a tablet computer, or a mainframe computer, and the second device ecosystem comprises an ecosystem associated with a mobile device. Similarly, in at least some embodiments, the first device ecosystem comprises an ecosystem associated with a first operating system, and the second device ecosystem comprises an ecosystem associated with a second operating system.

In at least some embodiments, the mapping engine configured to map a third identifier associated with a second device ecosystem with at least one of the first identifier or the second identifier comprises a mapping engine configured to: access activity log information indicative of one or more unmapped identifiers having accessed first and second network accesses, the one or more unmapped identifiers including the third identifier, the activity log information further including information indicative of the first and second identifiers having accessed at least one of the first network access or the second network access; for each identifier pair including the third identifier and the first identifier, assign or increment a first co-location occurrence score for each time the third identifier and the first identifier have contemporaneously accessed the first network access; for each identifier pair including the third identifier and the second identifier, assign or increment a first co-location occurrence score for each time the third identifier and the second identifier have contemporaneously accessed the first network access; for each identifier pair including the third identifier and the first identifier, assign or increment a second co-location occurrence score for each time the third identifier and the first identifier have contemporaneously accessed the second network access; for each identifier pair including the third identifier and the second identifier, assign or increment a second co-location occurrence score for each time the third identifier and the second identifier have contemporaneously accessed the second network access; for any unmapped identifiers only seen in identifier pairs only associated with one of the first co-location occurrence score or the second co-location occurrence score, filter out such unmapped identifiers associated with such identifier pairs; for each identifier pair, add the first co-location occurrence scores and the second co-location occurrence scores across all activity log information; and if either the identifier pair having the highest first co-location occurrence score or the identifier pair having the highest second co-location occurrence score includes at least one of the first identifier or the second identifier, then map the third identifier to the corresponding at least one of the first identifier or the second identifier.

Alternately, in at least some implementations, the mapping engine configured to map a third identifier associated with a second device ecosystem with at least one of the first identifier or the second identifier comprises a mapping engine configured to: access activity log information indicative of one or more unmapped identifiers having accessed first and second network accesses, the one or more unmapped identifiers including the third identifier, the activity log information further including information indicative of the first and second identifiers having accessed at least one of the first network access or the second network access; generate one or more identifier pairs, each identifier pair including at least one of the one or more unmapped identifiers and one of the first identifier or the second identifier; for each identifier pair, assign or increment a first co-location occurrence score for each time both identifiers of the identifier pair have accessed the first network access within a first specified period of time; for each identifier pair, assign or increment a second co-location occurrence score for each time both identifiers of the identifier pair have accessed the second network access within a second specified period of time; for each identifier pair, add the first co-location occurrence scores and the second co-location occurrence scores across all activity log information; for any unmapped identifiers having only one of the first co-location occurrence score or the second co-location occurrence score, filter out such unmapped identifier; for each remaining unmapped identifier, determine the identifier pair having a highest first co-location occurrence score and the identifier pair having a highest second co-location score; and if either the identifier pair having the highest first co-location occurrence score or the identifier pair having the highest second co-location occurrence score includes at least one of the first identifier or the second identifier, then map the third identifier to the corresponding at least one of the first identifier or the second identifier.

In addition, in at least some implementations, a system may further include a personalized services or products component configured to receive the indication of the association of the third identifier with the user and to provide at least one of a personalized service or personalized product based at least partially on the indication of the association of the third identifier with the user. Similarly, in at least some implementations, a system may further include a personalized services or products component configured to receive the indication of the association of the third identifier with the user, to select or generate a targeted advertisement tailored to the user based at least partially on the indication of the association of the third identifier with the user, and to provide the targeted advertisement customized to a device associated with the third identifier.

In addition, in at least some implementations, the mapping engine is further configured to map the first identifier with the second identifier.

In still other implementations, a method for mapping at least one of a first identifier or a second identifier with a third identifier, the first and second identifiers being associated with a user and with a first device ecosystem, the third identifier being associated with a second device ecosystem different from the first device ecosystem, the method at least partially implemented using one or more processing components, the method including mapping the third identifier associated with the second device ecosystem with at least one of the first identifier or the second identifier, the second device ecosystem being different from the first device ecosystem, and providing an indication of an association of the third identifier with the user. In at least some implementations, the mapping includes determining a plurality of first co-location occurrence scores indicative of the third identifier and one or more other identifiers accessing a first network access, determining a plurality of second co-location occurrence scores indicative of the third identifier and one or more other identifiers accessing a second network access, processing the plurality of first co-location occurrence scores and the plurality of second co-location occurrence scores to determine a highest first co-location occurrence score and a highest second co-location occurrence score; and if either the highest first co-location occurrence score corresponds to at least one of the first or second identifier, or the highest second co-location occurrence score corresponds to at least one of the first or second identifier, then map the third identifier to the corresponding at least one of the first identifier or the second identifier.

In at least some implementations, determining a plurality of first co-location occurrences scores indicative of the third identifier and one or more other identifiers accessing a first network access comprises determining a plurality of first co-location occurrences scores indicative of the third identifier and one or more other identifiers accessing a first network access within a first time period. Similarly, in at least some implementations, determining a plurality of first co-location occurrences scores indicative of the third identifier and one or more other identifiers accessing a first network access comprises determining a plurality of first co-location occurrences scores indicative of the third identifier and one or more other identifiers contemporaneously accessing a first network access.

Additionally, in at least some implementations, the first device ecosystem comprises an ecosystem associated with at least one of a personal computer, a desktop computer, a laptop computer, a server, a data store, a communication device, a tablet computer, or a mainframe computer, and the second device ecosystem comprises an ecosystem associated with a mobile device.

In further implementations, mapping a third identifier associated with a second device ecosystem with at least one of the first identifier or the second identifier comprises: accessing activity log information indicative of one or more unmapped identifiers having accessed first and second network accesses, the one or more unmapped identifiers including the third identifier, the activity log information further including information indicative of the first and second identifiers having accessed at least one of the first network access or the second network access; for each identifier pair including the third identifier and the first identifier, assigning or incrementing the first co-location occurrence score for each time the third identifier and the first identifier have contemporaneously accessed the first network access; for each identifier pair including the third identifier and the second identifier, assigning or incrementing the first co-location occurrence score for each time the third identifier and the second identifier have contemporaneously accessed the first network access; for each identifier pair including the third identifier and the first identifier, assigning or incrementing the second co-location occurrence score for each time the third identifier and the first identifier have contemporaneously accessed the second network access; for each identifier pair including the third identifier and the second identifier, assigning or incrementing the second co-location occurrence score for each time the third identifier and the second identifier have contemporaneously accessed the second network access; for any unmapped identifier having only one of the first co-location occurrence score or the second co-location occurrence score, filtering out such unmapped identifiers associated with such identifier pairs; and for each identifier pair, adding the first co-location occurrence scores and the second co-location occurrence scores across all activity log information.

In still other implementations, a method may further include providing at least one of a personalized service or personalized product to a device associated with the third identifier based at least partially on the indication of the association of the third identifier with the user.

In at least some implementations, one or more computer-readable media bearing one or more instructions that, when executed by one or more processing components, perform operations for mapping at least one of a first identifier or a second identifier with a third identifier, the first and second identifiers being associated with a user and with a first device ecosystem, the third identifier being associated with a second device ecosystem different from the first device ecosystem, the operations comprising: mapping the third identifier associated with the second device ecosystem with at least one of the first identifier or the second identifier, and providing an indication of an association of the third identifier with the user. In at least some implementations, the mapping includes: determining a plurality of first co-location occurrences scores indicative of the third identifier and one or more other identifiers accessing a first network access, determining a plurality of second co-location occurrence scores indicative of the third identifier and one or more other identifiers accessing a second network access, processing the plurality of first co-location occurrence scores and the plurality of second co-location occurrence scores to determine a highest first co-location occurrence score and a highest second co-location occurrence score; and if either the highest first co-location occurrence score corresponds to at least one of the first or second identifier, or the highest second co-location occurrence score corresponds to at least one of the first or second identifier, then map the third identifier to the corresponding at least one of the first identifier or the second identifier.

In addition, in some implementations, mapping a third identifier associated with a second device ecosystem with at least one of the first identifier or the second identifier comprises accessing activity log information indicative of one or more unmapped identifiers having accessed first and second network accesses, the one or more unmapped identifiers including the third identifier, the activity log information further including information indicative of the first and second identifiers having accessed at least one of the first network access or the second network access; for each identifier pair including the third identifier and the first identifier, assigning or incrementing the first co-location occurrence score for each time the third identifier and the first identifier have contemporaneously accessed the first network access; for each identifier pair including the third identifier and the second identifier, assigning or incrementing the first co-location occurrence score for each time the third identifier and the second identifier have contemporaneously accessed the first network access; for each identifier pair including the third identifier and the first identifier, assigning or incrementing the second co-location occurrence score for each time the third identifier and the first identifier have contemporaneously accessed the second network access; for each identifier pair including the third identifier and the second identifier, assigning or incrementing the second co-location occurrence score for each time the third identifier and the second identifier have contemporaneously accessed the second network access; for any unmapped identifier having only one of the first co-location occurrence score or the second co-location occurrence score, filtering out such unmapped identifiers associated with such identifier pairs; and for each identifier pair, adding the first co-location occurrence scores and the second co-location occurrence scores across all activity log information.

Similarly, in at least some implementations, one or more computer-readable media may further include one or more instructions for providing at least one of a personalized service or personalized product to a device associated with the third identifier based at least partially on the indication of the association of the third identifier with the user.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. An identifier mapping system for mapping at least one of a first identifier associated with a first device or a second identifier associated with a second device with a third identifier associated with a third device, the system comprising:
   a processing device operatively coupled to a memory;
   a mapping engine stored in the memory and, when executed by the processing device, configured to:
      detect that the first device associated with the first identifier has operatively communicated with a first location;
      detect that the second device associated with the second identifier has operatively communicated with a second location;
      detect that one or more other devices associated with one or more other device identifiers have operatively communicated with at least one of the first location or the second location;
      detect a plurality of first co-location occurrences of the third identifier with the first identifier at the first location;
      detect a plurality of second co-location occurrences of the third identifier with the second identifier at the second location;
      map the third identifier with at least one of the first identifier or the second identifier, the mapping being based at least partially on (i) filtering out any of the one or more other device identifiers that did not have at least one co-location occurrence with the third identifier at both the first location and the second location, (ii) determining from among all remaining co-location occurrences that the third identifier has a highest number of co-location occurrences with the first identifier at the first location, (iii) determining from among all remaining co-location occurrences that the third identifier has a highest number of co-location occurrences with the second identifier at the second location, and (iv) determining that the first identifier and the second identifier are associated with a user; and
      provide an indication of an association of the third identifier with the user.

2. The system of claim 1, wherein the first and second identifiers are associated with a first device ecosystem, and the third identifier is associated with a second device ecosystem different from the first device ecosystem.

3. The system of claim 1, wherein the plurality of first co-location occurrences of the third identifier with the first identifier at the first location comprises a plurality of instances of the third identifier and the first identifier accessing a first network access within a first time period, and
   wherein the plurality of second co-location occurrences of the third identifier with the second identifier at the second location comprises a plurality of instances of the third identifier and the second identifier accessing a second network access within a second time period.

4. The system of claim 1, wherein the plurality of first co-location occurrences of the third identifier with the first identifier at the first location comprises a plurality of instances of the third identifier and the first identifier contemporaneously accessing a first network access, and
   wherein the plurality of second co-location occurrences of the third identifier with the second identifier at the second location comprises a plurality of instances of the third identifier and the second identifier contemporaneously accessing a second network access.

5. The system of claim 2, wherein the first device ecosystem comprises an ecosystem associated with at least one of a personal computer, a desktop computer, a laptop computer, a server, a data store, a communication device, a tablet computer, or a mainframe computer, and
   wherein the second device ecosystem comprises an ecosystem associated with a mobile device.

6. The system of claim 2, wherein the first device ecosystem comprises an ecosystem associated with a first operating system associated with a first manufacturer, and
   wherein the second device ecosystem comprises an ecosystem associated with a second operating system associated with a second manufacturer.

7. The system of claim 1, wherein the mapping engine configured to map the third identifier with at least one of the first identifier or the second identifier comprises:
   a mapping engine configured to:
   access activity log information indicative of one or more unmapped identifiers having accessed first and second network accesses, the one or more unmapped identifiers including the third identifier, the activity log information further including information indicative of the first and second identifiers having accessed at least one of the first network access or the second network access;
   for each identifier pair including the third identifier and the first identifier, assign or increment a first co-location occurrence score for each time the third identifier and the first identifier have contemporaneously accessed the first network access;
   for each identifier pair including the third identifier and the second identifier, assign or increment a first co-location occurrence score for each time the third identifier and the second identifier have contemporaneously accessed the first network access;
   for each identifier pair including the third identifier and the first identifier, assign or increment a second co-location occurrence score for each time the third identifier and the first identifier have contemporaneously accessed the second network access;
   for each identifier pair including the third identifier and the second identifier, assign or increment a second co-location occurrence score for each time the third identifier and the second identifier have contemporaneously accessed the second network access;
   for any unmapped identifiers only seen in identifier pairs only associated with one of the first co-location occurrence score or the second co-location occurrence score, filter out such unmapped identifiers associated with such identifier pairs;
   for each identifier pair, add the first co-location occurrence scores and the second co-location occurrence scores across all activity log information; and
   if either the identifier pair having the highest first co-location occurrence score or the identifier pair having the highest second co-location occurrence score includes at least one of the first identifier or the second identifier, then map the third identifier to the corresponding at least one of the first identifier or the second identifier.

8. The system of claim 1, wherein the mapping engine configured to map the third identifier with at least one of the first identifier or the second identifier comprises:
   a mapping engine configured to:
   access activity log information indicative of one or more unmapped identifiers having accessed first and second network accesses, the one or more unmapped identifiers including the third identifier, the activity log information further including information indicative of the first and second identifiers having accessed at least one of the first network access or the second network access;
   generate one or more identifier pairs, each identifier pair including at least one of the one or more unmapped identifiers and one of the first identifier or the second identifier;
   for each identifier pair, assign or increment a first co-location occurrence score for each time both identifiers of the identifier pair have accessed the first network access within a first specified period of time;
   for each identifier pair, assign or increment a second co-location occurrence score for each time both identifiers of the identifier pair have accessed the second network access within a second specified period of time;
   for each identifier pair, add the first co-location occurrence scores and the second co-location occurrence scores across all activity log information;
   for any unmapped identifiers having only one of the first co-location occurrence score or the second co-location occurrence score, filter out such unmapped identifier;
   for each remaining unmapped identifier, determine the identifier pair having a highest first co-location occurrence score and the identifier pair having a highest second co-location score; and
   if either the identifier pair having the highest first co-location occurrence score or the identifier pair having the highest second co-location occurrence score includes at least one of the first identifier or the second identifier, then map the third identifier to the corresponding at least one of the first identifier or the second identifier.

9. The system of claim 1, further comprising:
   a personalized services or products component configured to receive the indication of the association of the third identifier with the user and to provide at least one of a personalized service or personalized product based at least partially on the indication of the association of the third identifier with the user.

10. The system of claim 1, further comprising:
    a personalized services or products component configured to receive the indication of the association of the third identifier with the user, to select or generate a targeted advertisement tailored to the user based at least partially on the indication of the association of the third identifier with the user, and to provide the targeted advertisement customized to a device associated with the third identifier.

11. The system of claim 1, wherein the mapping engine is further configured to:
map the first identifier with the second identifier.

12. A method for mapping at least one of a first identifier associated with a first device or a second identifier associated with a second device with a third identifier associated with a third device, the method comprising:
mapping the third identifier with at least one of the first identifier or the second identifier using one or more processing devices, the mapping-including:
(i) determining a plurality of first co-location occurrences indicative of the third identifier and the first identifier accessing a first network access at a first location;
(ii) determining a plurality of second co-location occurrences indicative of the third identifier and one or more other identifiers accessing a second network access at a second location;
(iii) processing the plurality of first co-location occurrences and the plurality of second co-location occurrences, the processing including:
(a) filtering out one or more other device identifiers that did not have at least one co-location occurrence with the third identifier at both the first location and the second location,
(b) determining from among all remaining co-location occurrences that the third identifier has a highest number of co-location occurrences with the first identifier at the first location, and
(c) determining from among all remaining co-location occurrences that the third identifier has a highest number of co-location occurrences with the second identifier at the second location; and
(iv) if the first identifier and the second identifier are associated with a user, then mapping the third identifier to at least one of the first identifier or the second identifier, and providing an indication of an association of the third identifier with the user.

13. The method of claim 12, wherein determining a plurality of first co-location occurrences indicative of the third identifier and one or more other identifiers accessing a first network access at a first location comprises determining a plurality of first co-location occurrences indicative of the third identifier and one or more other identifiers accessing a first network access at a first location within a first time period.

14. The method of claim 12, wherein the plurality of first co-location occurrences indicative of the third identifier and one or more other identifiers accessing a first network access at a first location are determined during an assumed working-hours time period, and wherein the plurality of second co-location occurrences indicative of the third identifier and one or more other identifiers accessing a second network access at a second location are determined during an assumed home-hours time period.

15. The method of claim 12, wherein the first device and the second device are associated with a first device ecosystem, the first device ecosystem including at least one of an ecosystem associated with at least one of a personal computer, a desktop computer, a laptop computer, a server, a data store, a communication device, a tablet computer, or a mainframe computer, and wherein the third device is associated with a second device ecosystem, the first second ecosystem including at least one of an ecosystem associated with a mobile device.

16. The method of claim 12, wherein mapping a third identifier with at least one of the first identifier or the second identifier comprises:
accessing activity log information indicative of one or more unmapped identifiers having accessed first and second network accesses, the one or more unmapped identifiers including the third identifier, the activity log information further including information indicative of the first and second identifiers having accessed at least one of the first network access or the second network access;
for each identifier pair including the third identifier and the first identifier, assigning or incrementing the first co-location occurrence score for each time the third identifier and the first identifier have contemporaneously accessed the first network access;
for each identifier pair including the third identifier and the second identifier, assigning or incrementing the first co-location occurrence score for each time the third identifier and the second identifier have contemporaneously accessed the first network access;
for each identifier pair including the third identifier and the first identifier, assigning or incrementing the second co-location occurrence score for each time the third identifier and the first identifier have contemporaneously accessed the second network access;
for each identifier pair including the third identifier and the second identifier, assigning or incrementing the second co-location occurrence score for each time the third identifier and the second identifier have contemporaneously accessed the second network access;
for any unmapped identifier having only one of the first co-location occurrence score or the second co-location occurrence score, filtering out such unmapped identifiers associated with such identifier pairs; and
for each identifier pair, adding the first co-location occurrence scores and the second co-location occurrence scores across all activity log information.

17. The method of claim 12, further comprising:
providing at least one of a personalized service or personalized product to a device associated with the third identifier based at least partially on the indication of the association of the third identifier with the user.

18. A system, comprising:
one or more processing devices;
one or more computer-readable media bearing one or more instructions that, when executed by the one or more processing devices, perform operations for mapping at least one of a first identifier associated with a first device or a second identifier associated with a second device with a third identifier associated with a third device, the operations comprising:
determining a plurality of first co-location occurrences indicative of the third identifier and the first identifier accessing a first network access at a first location during an assumed work-hours period;
determining a plurality of second co-location occurrences indicative of the third identifier and the second identifier accessing a second network access at a second location during an assumed non-working-hours period;

processing the plurality of first co-location occurrences and the plurality of second co-location occurrences, the processing including:
   filtering out one or more other device identifiers that did not have at least one co-location occurrence with the third identifier at both the first location and the second location,
   determining from among all remaining co-location occurrences that the third identifier has a highest number of co-location occurrences with the first identifier at the first location, and
   determining from among all remaining co-location occurrences that the third identifier has a highest number of co-location occurrences with the second identifier at the second location; and
if the first identifier and the second identifier are associated with a user, then mapping the third identifier to at least one of the first identifier or the second identifier, and providing an indication of an association of the third identifier with the user.

19. The system of claim 18 wherein at least some of the plurality of first co-location occurrences, and the plurality of second co-location occurrences are determined based on activity log information.

20. The system of claim 18, wherein at least one of the first device or the second device is a desktop computer that is configured to be operatively coupled to a corresponding one of the first network access or the second network access.

* * * * *